(12) United States Patent
Eroglu et al.

(10) Patent No.: US 10,027,412 B2
(45) Date of Patent: Jul. 17, 2018

(54) SYSTEM AND METHOD FOR VISIBLE LIGHT COMMUNICATIONS WITH MULTI-ELEMENT TRANSMITTERS AND RECEIVERS

(71) Applicants: Yusuf S. Eroglu, Miami, FL (US); Ismail Guvenc, Raleigh, NC (US); Nezih Pala, Ft. Lauderdale, FL (US)

(72) Inventors: Yusuf S. Eroglu, Miami, FL (US); Ismail Guvenc, Raleigh, NC (US); Nezih Pala, Ft. Lauderdale, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/447,478

(22) Filed: Mar. 2, 2017

(65) Prior Publication Data
US 2017/0346559 A1  Nov. 30, 2017

Related U.S. Application Data

(60) Provisional application No. 62/341,788, filed on May 26, 2016.

(51) Int. Cl.
*H04B 10/00* (2013.01)
*H04B 10/116* (2013.01)
*H04B 10/50* (2013.01)
*H04B 10/079* (2013.01)

(52) U.S. Cl.
CPC ..... *H04B 10/116* (2013.01); *H04B 10/07953* (2013.01); *H04B 10/502* (2013.01)

(58) Field of Classification Search
CPC .... H04B 10/116; H04B 10/502; H04B 10/61; H04B 10/613

USPC .......................................................... 398/131
See application file for complete search history.

(56) References Cited

U.S. PATENT DOCUMENTS

| | | | |
|---|---|---|---|
| 7,548,698 B2 | 6/2009 | Yamamoto | |
| 2006/0214815 A1 | 9/2006 | Komatsu | |
| 2008/0181617 A1* | 7/2008 | Ann | H04B 10/1149 398/158 |
| 2008/0320200 A1 | 12/2008 | Pederson et al. | |
| 2010/0067916 A1 | 3/2010 | Suzuki et al. | |
| 2011/0069962 A1 | 3/2011 | Castor et al. | |
| 2011/0135317 A1 | 6/2011 | Chaplin | |
| 2012/0275796 A1* | 11/2012 | Yokoi | H04B 10/1141 398/130 |

(Continued)

OTHER PUBLICATIONS

Gomez et al., "Beyond 100-Gb/s indoor wide field-of-view optical wireless communications," IEEE Photonics Technology Letters, Feb. 15, 2015, pp. 367-370, vol. 27, No. 4.

(Continued)

*Primary Examiner* — Don N Vo
(74) *Attorney, Agent, or Firm* — Saliwanchik, Lloyd & Eisenschenk

(57) ABSTRACT

Apparatuses, systems, and methods of communication using visible light communications (VLC) are provided. A system can include a VLC transmitter and a VLC receiver suitable for implementing a diversity combining technique. The diversity combining technique can include equal gain combining, selective best combining, and maximal ratio combining. The VLC transmitter can be a multi-element diversity transmitter and can provide illumination as well as data transfer.

9 Claims, 22 Drawing Sheets

(56) References Cited

U.S. PATENT DOCUMENTS

| | | | | |
|---|---|---|---|---|
| 2014/0255038 | A1* | 9/2014 | Richards, IV | H04B 10/116 398/118 |
| 2015/0326314 | A1 | 11/2015 | Addy | |
| 2017/0180055 | A1* | 6/2017 | Yu | H04B 10/612 |
| 2017/0201321 | A1* | 7/2017 | Uysal | H04B 10/116 |

OTHER PUBLICATIONS

Gong et al., "Linear receivers for optical wireless scattering communication with multiple photon detectors," Globecom 2014 Workshop—Optical Wireless Communications, Dec. 2014, pp. 438-443.

Nuwanpriya et al., "Angle diversity receiver for indoor MIMO visible light communications," Globecom 2014 Workshop—Optical Wireless Communications, Dec. 2014, pp. 444-449.

Tsiatmas et al., "Optimum diversity combining techniques for visible light communication systems," Globecom 2014 Workshop—Optical Wireless Communications, Dec. 2014, pp. 456-461.

Chen et al., "Improving SINR in indoor cellular visible light communication networks," IEEE International Conference on Communications—Optical Networks and Systems, Jun. 2014, pp. 3383-3388.

Claeyssen et al., "Mechanisms based on piezo actuators," Proceedings of SPIE—The International Society for Optics and Photonics, Dec. 2001, pp. 225-233, vol. 4332.

Sahin et al., "Hybrid 3-D localization for visible light communication systems," Journal of Lightwave Technology, Nov. 15, 2015, pp. 4589-4599, vol. 33, No. 22.

Keskin et al., "Comparative theoretical analysis of distance estimation in visible light positioning systems," Journal of Lightwave Technology, Feb. 1, 2016, pp. 854-865, vol. 34, No. 3.

Yin et al., "Indoor visible light positioning with angle diversity transmitter," Proceedings of IEEE Vehicular Technology Conference, Sep. 2015, pp. 1-5.

Chen et al., "Joint transmission in indoor visible light communication downlink cellular networks," Globecom 2013 Workshop—Optical Wireless Communications, Dec. 2013, pp. 1127-1132.

Kim et al., "A proportional fair scheduling for multicarrier transmission systems," IEEE Communications Letters, Mar. 2005, pp. 210-212, vol. 9, No. 3.

Bykhovsky et al., "Multiple access resource allocation in visible light communication systems," Journal of Lightwave Technology, Mar. 15, 2014, pp. 1594-1600, vol. 32, No. 8.

Zhang et al., "Optimal power allocation in spatial modulation OFDM for visible light communications," IEEE Vehicular Technology Conference, May 2012, pp. 1-5.

Roodman, "Postoptimality analysis in integer programming by implicit enumeration: the mixed integer case," Naval Research Logistics Quarterly, Dec. 1974, pp. 595-607, vol. 21, No. 4.

Duek et al., "Small Cell Networks Overview," Small Cell Networks: Deployment, PHY Techniques, and Resource Management, Jun. 2013, pp. 1-12, Cambridge University Press.

Rajbhandari et al., "High-speed integrated visible light communication system: device constraints and design considerations," IEEE Journal on Selected Areas in Communications, Sep. 2015, pp. 1750-1757, vol. 33, No. 9.

Bilgi et al., "Optical wireless localization," Wireless Networks, 2012, pp. 215-226, vol. 18.

Yuksel et al., "Free-space-optical mobile ad hoc networks: auto-configurable building blocks," Wireless Networks, 2009, pp. 295-312, vol. 15.

Eroglu et al., "Multi-element transmitter design and performance evaluation for visible light communication," Proceedings of IEEE International Workshop on Optical Wireless Communications, Dec. 2015, pp. 1-6, San Diego, California.

Palathingal et al., "A multi-element vlc architecture for high spatial reuse," Proceedings of ACM Workshop on Visible Light Communication Systems, Sep. 2015, pp. 21-26, Paris, France.

Sahin et al., "Accuracy of AOA-based and RSS-based 3D localization for visible light communications," Proceeding of IEEE Vehicular Technology Conference (VTC), Sep. 2015, pp. 1-5, Boston, Massachusetts.

Eroglu et al., "AOA-based localization and tracking in multi-element vlc systems," Proceedings of IEEE Wireless and Microwave Conference, Apr. 2015, pp. 1-5, Cocoa Beach, Florida.

Mostafa et al., "Physical-layer security for indoor visible light communications," Proceedings of IEEE International Communications Conference (ICC), Jun. 2014, pp. 1-6, Sydney, Australia.

Kavehrad, "Sustainable energy-efficient wireless applications using light," IEEE Communications Magazine: Consumer Communications and Networking, Dec. 2010, pp. 66-73, vol. 48.

Barry et al., "Simulation of multipath impulse response for indoor wireless optical channels," IEEE Journal on Selected Areas in Communications, Apr. 1993, pp. 367-379, vol. 11, No. 3.

Bu et al., "Generalized proportional fair scheduling in third generation wireless data networks," Proceedings of IEEE International Conference on Computer Communications (INFOCOM), Apr. 2006, pp. 1-12.

Lee et al., "Coordinated multipoint transmission and reception in LTE-advanced: deployment scenarios and operational challenges," IEEE Communications Magazine: LTE-Advanced and 4G Wireless Communications, Feb. 2012, pp. 148-155, vol. 50, No. 2.

Sun et al., "Interference management through comp in 3GPP LTE-advanced networks," IEEE Wireless communications, Feb. 2013, pp. 59-66, vol. 20, No. 1.

Lampe et al., "Coordinated broadcasting for multiuser indoor visible light communication systems," IEEE Transactions on Communications, Sep. 2015, pp. 1-12, vol. 63, No. 9.

Kelly et al., "Rate control for communication networks: shadow prices, proportional fairness and stability," The Journal of the Operational Research Society, Nov. 1997, pp. 237-252, vol. 49, No. 3.

Andrews et al., "Optimal utility based multi-user throughput allocation subject to throughput constraints," Proceedings of 24th Annual Joint Conference of the IEEE Computer and Communications Societies, Mar. 2005, pp. 2415-2424.

Woeginger, "Exact algorithms for NP-hard problems: a survey," Combinatorial Optimization—Eureka, You Shrink, Jan. 2003, pp. 185-207, Springer-Verlag Berlin Heidelberg.

Frieze, "Complexity of a 3-dimensional assignment problem," European Journal of Operational Research, 1983, pp. 161-164, vol. 13, No. 2.

Sewaiwar et al., "Smart LED allocation scheme for efficient multiuser visible light communication networks," Optics Express, May 18, 2015, pp. 1-10, vol. 23, No. 10.

Rhee et al., "Increase in capacity of multiuser OFDM system using dynamic subchannel allocation," Proceedings of IEEE Vehicular Technology Conference (VTC), 2000, pp. 1085-1089, vol. 2.

Shen et al., "Adaptive resource allocation in multiuser OFDM systems with proportional rate constraints," IEEE Transactions on Wireless Communications, Nov. 2005, pp. 2726-2737, vol. 4, No. 6.

Jain et al., "A quantitative measure of fairness and discrimination for resource allocation in shared computer system," Eastern Research Laboratory, Sep. 26, 1984, pp. 1-37, Digital Equipment Corporation, Hudson, MA.

Marshoud et al., "Non-orthogonal multiple access for visible light communications," IEEE Photonics Technology Letters, 2016, pp. 1-4, vol. 28, No. 1.

* cited by examiner

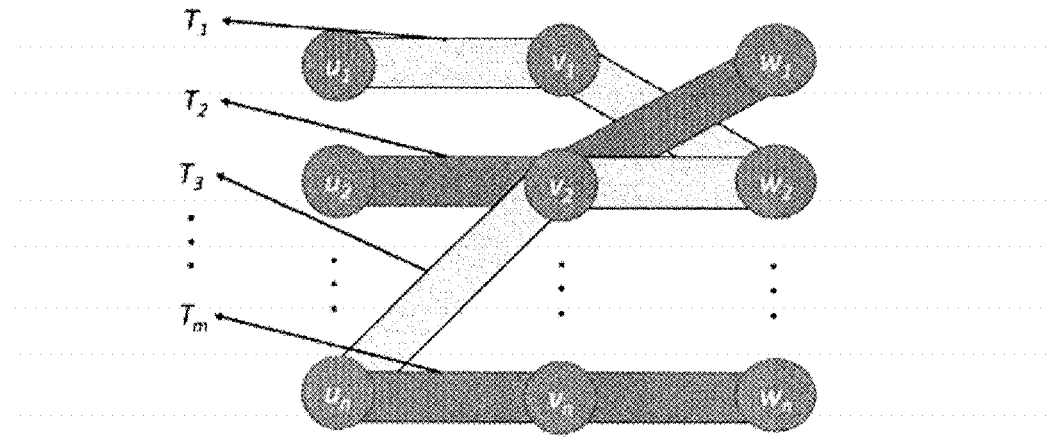
Figure 16
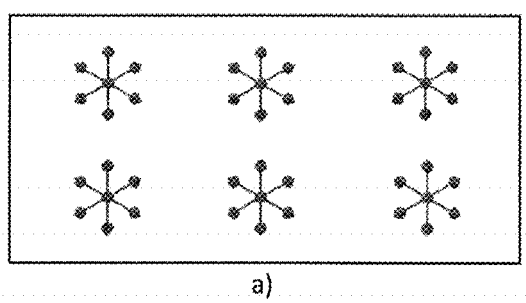 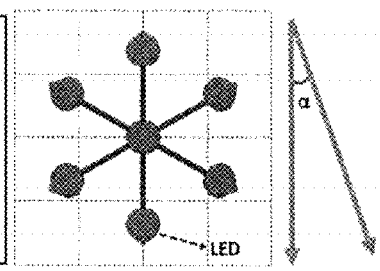
Figure 17(a)    Figure 17(b)

SYSTEM AND METHOD FOR VISIBLE LIGHT COMMUNICATIONS WITH MULTI-ELEMENT TRANSMITTERS AND RECEIVERS

This application claims the benefit of U.S. Provisional Application Ser. No. 62/341,788, filed May 26, 2016, the disclosure of which is hereby incorporated by reference in its entirety, including all figures, tables and drawings.

GOVERNMENT SUPPORT

The subject invention was made with government support under a research project supported by the NSF CNS, Award No. CNS-1422062. The government has certain rights in the invention.

BACKGROUND

There has been a continued proliferation of both mobile and fixed devices that require data connectivity. Wired connections and radio-frequency transmissions have been the common solutions for transmitting data. However, each of these methods has its drawbacks. Wired connections are inconvenient, can be costly to implement, and are often unsightly. With greater and greater use of radio-frequency transmissions, there has been an increase in interference, causing loss of data, disconnections, and reduced performance. In addition, although sometimes a benefit, radio waves can penetrate walls and other structures where they can be intercepted by unintended parties, resulting in security concerns such as identity and data theft. Therefore, there is always a need for additional convenient, effective, and secure methods for transmitting data.

BRIEF SUMMARY

Embodiments of the present invention relate to visible light communications (VLC). Visible Light Communications (VLC) is an emerging wireless communication technology that can serve high speed data rates by using lighting structures without further congesting the radio spectrum. With recent advancements in light emitting diodes, VLC transceivers can be cheap, small, lightweight, densely integrated, reliable, low power, modulated at high speeds, and operate in large swathes of an unlicensed spectrum amenable to wavelength-division multiplexing. Another benefit of VLC over traditional Wi-Fi is that, because light cannot propagate out of most indoor spaces, unintended third parties cannot intercept the transmitted data and there is less interference between devices.

Embodiments of the present invention include various transmitter and transceiver structures, configurations, and multi-element VLC receivers that can maintain link quality. Embodiments of the present invention also include multi-element angle diversity transceiver structures and novel beam steering techniques using piezo-electric based tilting of LEDs to improve SINR. Embodiments of the present invention further include methods of diversity combining at the receiver, multi-LED assignment schemes for different users that can improve link quality and throughput, and methods of optimizing the positioning of both VLC receivers and transmitters. Many of the embodiments of the present invention seek to perform joint and adaptive optimization of conflicting goals including illumination, communication, net throughput, and sharing resources between users.

BRIEF DESCRIPTION OF THE DRAWINGS

FIG. 16 is a diagram illustrating a 3D matching problem.

FIG. 17(a) is a layout diagram of access points (APs) in a room. FIG. 17(b) is a diagram illustrating an AP from a top view and the divergence angle of side LEDs relative to a central LED.

DETAILED DESCRIPTION

Figures 1A, 1B, 1C:
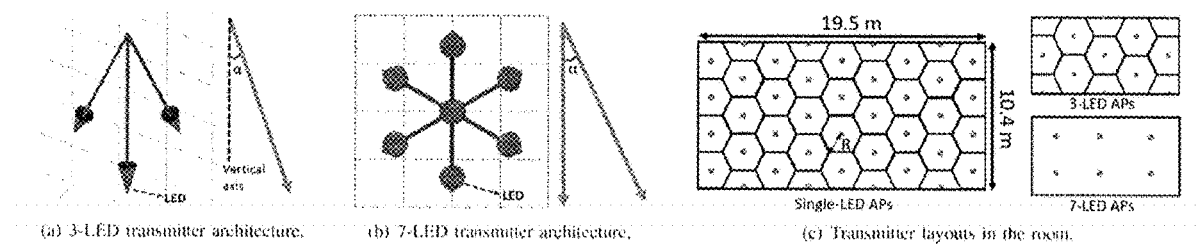
FIG. 1a is an illustration of a 3-LED transmitter architecture.
FIG. 1b is an illustration of a 7-LED transmitter architecture.
FIG. 1c is an illustration of LED deployment strategies according to embodiments of the present invention.

Visible Light Communications (VLC) is an emerging wireless communication technology that can serve high speed data rates by using existing lighting structures without congesting the radio spectrum. Embodiments of the present invention include novel transmitter structures, multi-element VLC transmitters and receivers, and multi-element angle diversity transceiver structures that can improve link quality. Signal-to-interference-plus noise-ratio (SINR) distribution is investigated via extensive simulations considering a multipath environment with different transceiver configurations and diversity combining techniques. Embodiments of the present invention can result in significant SINR gains using optimized transceiver configurations, beam steering at the transmitter, and diversity combining at the receiver.

VLC has a very large bandwidth with operation frequencies ranging from 430 THz to 750 THz, making it able to accommodate many users with high transmission speeds. Embodiments of the present invention can be used to opportunistically offload cellular users to alternative wireless communications network. Embodiments of the present invention include methods of deploying multi-element angle diversity transmitters within a room using different diversity combining techniques at the receiver. In particular, embodiments of the present invention include single-LED, 3-LED, and 7-LED architectures. Embodiments of the present invention can include diversity combining techniques including equal gain combining (EGC), selective best combining (SBC), maximal ratio combining (MRC), and optimal combining (OPC).

A light source S with a unit transmit power can be represented with three parameters as $S=\{r_{src}, n_{src}, n\}$, where $r_{src}$ is the location of the light source, $n_{src}$ is the direction of the light source, and n is the LED mode, which characterizes the directivity of the LED. A receiver R can be modeled as $R=\{r_{rec}, n_{rec}, A_R, \theta_{FOV}\}$, where $r_{rec} \in R^{3 \times 1}$ is the location of the PD, $n_{rec} \in R^{3 \times 1}$ is the direction of the PD, $A_R$ is the area in m$^2$, and $\theta_{FOV}$ is the FOV of the PD.

The line-of-sight (LOS) component of the channel between source S and receiver R is given by $$h^0(S, R) = \frac{n+1}{2\pi} \cos^n(\phi) \cos(\theta) \frac{A_R}{R^2} \Pi\left(\frac{\theta}{\theta_{FOV}}\right), \quad (1)$$

where $\phi$ is the angle between the source direction vector and the incidence vector, $\theta$ is the angle between the PD direction vector and incidence vector, R is the distance between the source and the receiver, and $\Pi$ is the rectangular function:

$$\Pi(x) \triangleq \begin{cases} 1 & \text{for } |x| \leq 1 \\ 0 & \text{for } |x| > 1 \end{cases}. \quad (2)$$

The non-line-of-sight (NLOS) component of the channel is obtained based on a multiple bounce impulse response model. As the light can reach the PD after several reflections, the channel impulse response due to the NLOS components can be written as $$h(S, R) = \sum_{d=0}^{\infty} h^{(d)}(S, R), \quad (3)$$

where d is the reflection order. Theoretically, $h^{(d)}(S,R)$ can be expressed as a recursive function given by $$h^{(d)}(S, R) = \int_S \rho_{refl} \times h^0\left(S, \{r_{refl}, n_{refl}, dA, \frac{\pi}{2}\}\right) * h^{(d-1)}(\{r_{refl}, n_{refl}, 1\}, R). \quad (4)$$

In (4), * is the convolution operation, $r_{refl}$ and $n_{refl}$ stand for the location and the direction of the reflector, respectively, dA is the infinitesimal area of the reflector, and $\rho_{refl} \in [0, 1)$ is the reflection coefficient. In addition, the FOV and the mode n of the reflector are set to $\pi/2$ and 1, respectively.

FIG. 1 illustrates three different transmitter architectures and three deployment strategies. In the first configuration of FIG. 1c, it is assumed that there is a single LED per transmitter, which is steered toward the floor. For the second configuration, there are three LEDs for each VLC transmitter, and each LED is tilted with an angle of a degrees. They are also separated from each other with an azimuth angle of 120°. In the third configuration, a VLC transmitter with 7 LEDs is illustrated in which one of the LEDs is steered towards the floor and the rest are tilted with an angle of α degrees.

Embodiments of the present invention can include three different multi-element receiver configurations. In the first configuration, the receiver has only a single PD. In the second configuration, there are three PDs and each PD has a tilt angle of β degrees from the normal of the receiver. In the third configuration, the receiver structure has seven PDs. While the direction of one of PDs is parallel to the direction of receiver, a second layer of PDs are tilted with an angle of β degrees. In some embodiments, the PDs have the same FOV $\beta_{FOV}$ and surface area $A_R$.

In a single PD receiver architecture, receiver diversity techniques cannot be implemented as the receiver observes only one copy of the transmitted signal. In this case, the SINR is calculated as:

$$SINR = \frac{P_{l_d}^2}{N_0 B + \sum_{l=1, l \neq l_d}^{L} P_l^2} \quad (5)$$

where $P_l$ is received signal strength from lth LED, $l_d$ stands for desired LED, $$\sum_{\substack{l=1 \\ l \neq l_d}}^{L} P_l^2$$

represents the interference signal power from interfering LEDs, $N_0$ is the spectral density of the additive white Gaussian noise (AWGN), and B is the communication bandwidth.

A general formula for the SINR calculation of multi-element receiver is given as follows:

$$SINR = \frac{\left(\sum_{p=1}^{P} \omega_p P_{p,l_d}\right)^2}{\sum_{p=1}^{P} \omega_p^2 N_0 B + \sum_{l=1, l \neq l_d}^{L} \left(\sum_{p=1}^{P} \omega_p P_{p,l}\right)^2}, \quad (6)$$

where $w_p$ is weight for pth PD, and the second part in the denominator represents the sum of all interference signal power from an interfering lth LED to all PDs. The weights for the different receiver combining techniques are as follows.

In equal gain combining (EGC), all weights $w_p$ in (6) are the same (equal to 1), and receiver combining does not yield an extra benefit over a single PD detector. In contrast, EGC can cause worse SINR performance as the received signal may be heavily directional. For selective best combining (SBC), the SINR is calculated the same as the single PD receiver case for each receiver as in (5). The one giving the highest SINR is selected, and data from other PDs are not used. Therefore, the weight in (6) for the PD with best SINR is 1, while the rest of the weights are 0. The SBC yields a high SINR gain in comparison to a single PD and EGC. Since one PD receives the light from a narrower angle, it receives less interference.

In maximum ration combining (MRC), each PD is weighted according its SINR. Since all PDs are taken into account in the effective SINR calculation proportionally, MRC outperforms SBC, and the weights are calculated as:

$$w_p = P_{p,l_d}^2 \times \left(N_0 B + \sum_{l=1, l \neq l_d}^{L} P_{p,l}^2\right)^{-1}. \quad (7)$$

In optimum ratio combining (OPC), correlations between signals observed at different PDs are exploited. When the dominant part of the channel is LOS (e.g., the single LED scenario in FIG. 1c), OPC gives only marginal gains when compared with the MRC. On the other hand, with multi-element VLC scenario, the same information is transmitted from the LEDs in the same AP, which introduces further correlation at receiver antennas, and OPC may significantly outperform MRC. The weights for optimal combining can be calculated as $w_p = R^{-1} ul_d$, where $ul_d = [P_1, l_d, P_2, l_d, \ldots, P_P, l_d]$ is the desired received signal, $R_n$ is the interference-plus-noise correlation matrix of the received signal, explicitly given by $$R_n = N_0 B I + \sum_{l \neq l_d} E[u_l u_l^T], \quad (8)$$

where I is identity matrix, and $u_l = [P_1, 1, P_2, 1, \ldots, P_P, 1]$ is the interference signal power from lth LED. In one variation of calculating (8), the receiver can use the information from the transmitter on the LED assignments to all users. In other words, all the LEDs serving a particular user can be combined as if they were a single LED, since they are transmitting the same information. Then, the number of LEDs on the access point can be replaced by a smaller number of virtual LEDs and, hence, the calculation of the covariance matrix in (8) can be updated accordingly. This approach is shown to provide 2 dB to 3 dB of SINR gain in system level simulations using the OPC technique, when compared to not using LED assignment information for the OPC technique.

Because VLC can provide highly accurate localization information, this location information can be used for beam steering to further enhance communication performance. Beam steering is commonly used in free space optic (FSO) systems. Because FSO light beams are highly directional, accurate steering is important for these systems. In contrast, VLC light beams have broader divergence angles, and diffusion properties of light can be used for both illumination and communication purposes. However, by manipulating the orientation of light sources, a gain in the SINR is possible, especially when LEDs with higher LED modes are used. An inexpensive method for beam steering according to embodiments of the present invention includes using piezoelectric actuators to adjust the direction of LEDs. Piezoelectric actuators convert electrical energy to mechanical energy and allow for precise movement control. Piezoelectric actuators are used for applications such as adjusting lenses, mirrors, and other equipment. In VLC applications according to some embodiments of the present invention, piezoelectric actuators can be used to change the direction of LEDs, as in FIG. 2a.

In some embodiments of the present invention, the LEDs are steered to track the location of the receiver, which is known by the transmitter. Since each LED may serve only a small area, the required steering angle only needs to be small, which makes piezoelectric actuators highly suitable for this application. When a user arrives at a location where further steering of an LED is not possible due to limitations of the piezoelectric actuators, then a handover is considered either to another LED in the same AP, or to a different LED in a neighboring AP.

In order to develop embodiments of the present invention, computer simulations were performed to evaluate the SINR performance of different diversity combining schemes for different transmitter and receiver configurations. A room with dimensions of 19.5 m by 10.4 m with a height of 4 m was considered. The deployment scenarios of the VLC transmitters according to an embodiment of the present invention are illustrated in FIG. 1c. In order to achieve a fair comparison between different deployment scenarios, in total, there are 40 LEDs deployed in the single-LED transmitter scenario, 39 LEDs deployed in the 3-LED transmitter scenario, and 42 LEDs deployed for the 7-LED transmitter scenario.

In some embodiments of the present invention, tilt angles of LEDs for 3-LED and 7-LED transmitters can be 25° to 45°, a 35° to 55°, respectively. More specifically, tilt angles of LEDs for 3-LED and 7-LED transmitters can be approximately 35° and 45°, respectively. These angles were arrived at after a thorough investigation to give maximum overall SINR. Other simulation parameters are given in Table I. By changing the location of the receiver, CDF of SINR is evaluated at all locations in the room. The height of the receiver in the simulations presented was assumed to be 0.85 m.

TABLE I

Simulation parameters.

| | |
|---|---|
| LED mode, n | 7.0459 |
| Transmission power of an LED, $P_t$ | 3 W |
| Modulation bandwidth, W | 20 MHz |
| AWGN spectral density, $N_O$ | $2.5 \times 10^{-23}$ A/Hz |
| Effective surface area of PDs, $A_R$ | 10 mm$^2$ |
| Reflection coefficient for walls, $\rho_{refl}$ | 0.8 |
| Reflection coefficient for floor and ceiling, $\rho_{refl}$ | 0.3 |

Figure 3:
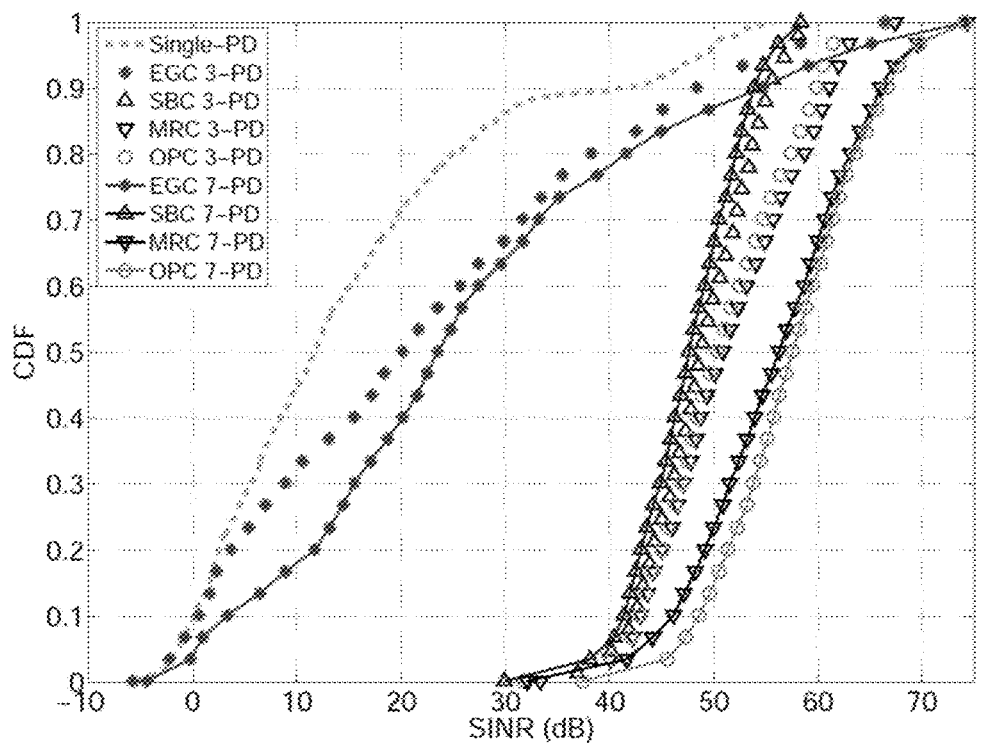
FIG. 3 is a graph of signal to noise ratio (SINR) vs cumulative distribution function (CDF) for different combining schemes using a single-LED access point.

In FIG. 3, the CDF of SINR for different receiver types and combining schemes are illustrated considering a single LED transmitter configuration. A single-PD receiver yields an SINR between −5 dB and 30 dB, in 90% of the regions, while a 3-PD receiver yields an SINR between 35 dB and 65 dB, except when EGC is used. MRC, OPC and SBC show similar performance for 3-PD configurations. For a 7-PD scenario, MRC and OPC yield SINRs between 40 dB and 70 dB, and outperform 3-PD receivers. In general, MRC was shown to perform better than SBC, and OPC performed slightly better than MRC. Since OPC uses the correlation information at reflections from walls, it provides better performance. However, since the dominant component of the signal is line-of-sight for single-LED configurations, there is no significant difference between MRC and OPC. EGC performs worse in single-PD scenarios, since it equally combines signals from different PDs, which look towards different LEDs, whereas, in the scenario in FIG. 3, only one LED can be chosen.

Figure 4:
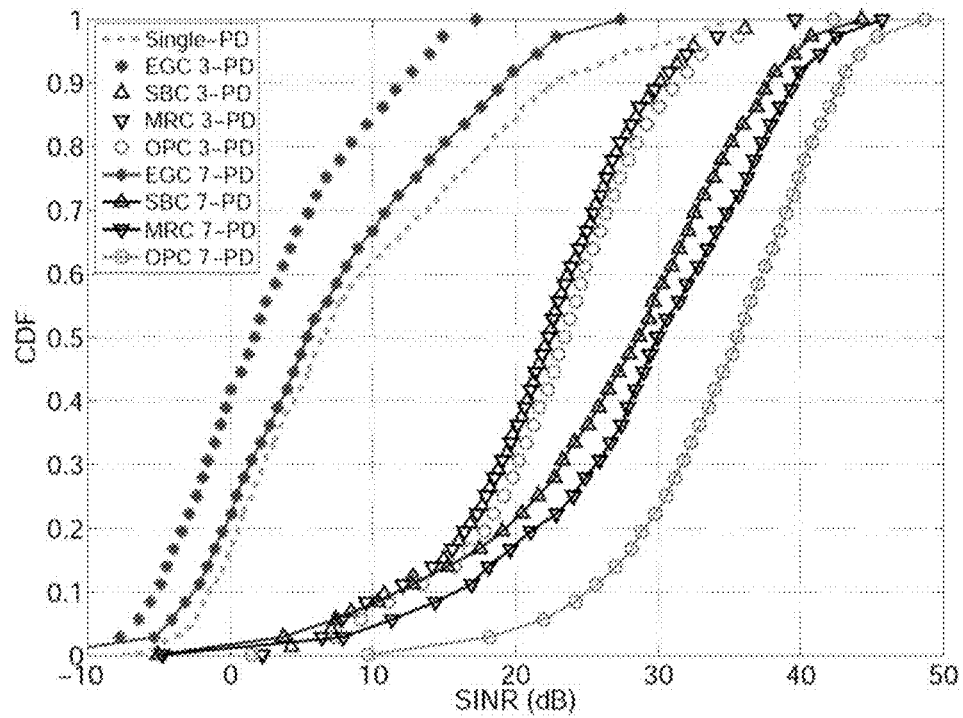
FIG. 4 is a graph of signal to noise ratio (SINR) vs cumulative distribution function (CDF) for different combining schemes using a 3-LED access point.

FIG. 4 is similar to FIG. 3, except that a 3-LED transmitter configuration is used. This case differs from previous one, since the signals are not always oriented directly downwards, but instead are transmitted at different angles. In this scenario there are two main differences compared to the cases presented in FIG. 3. First, the SINR distributions are lower than those in FIG. 3, since LEDs are not placed evenly in the room. Second, OPC provides much higher gain than MRC. For example, in the 7-PD receiver scenario, it gives 5 dB gain over MRC in most regions, since LEDs are directed at different angles and wall reflection played a more important role in the overall signal received. This makes OPC ideal when angle diversity transmitters are used. In general, it can be said that while single element receivers yield 10 dB SINR in this configuration, a 3-PD receiver provides 15 dB extra gain, whereas, when OPC is used, 7-PD transmitters provide 30 dB gain. In this condition, multi-element receivers solve the low SINR problem of multi-element transmitters.

Figure 5:
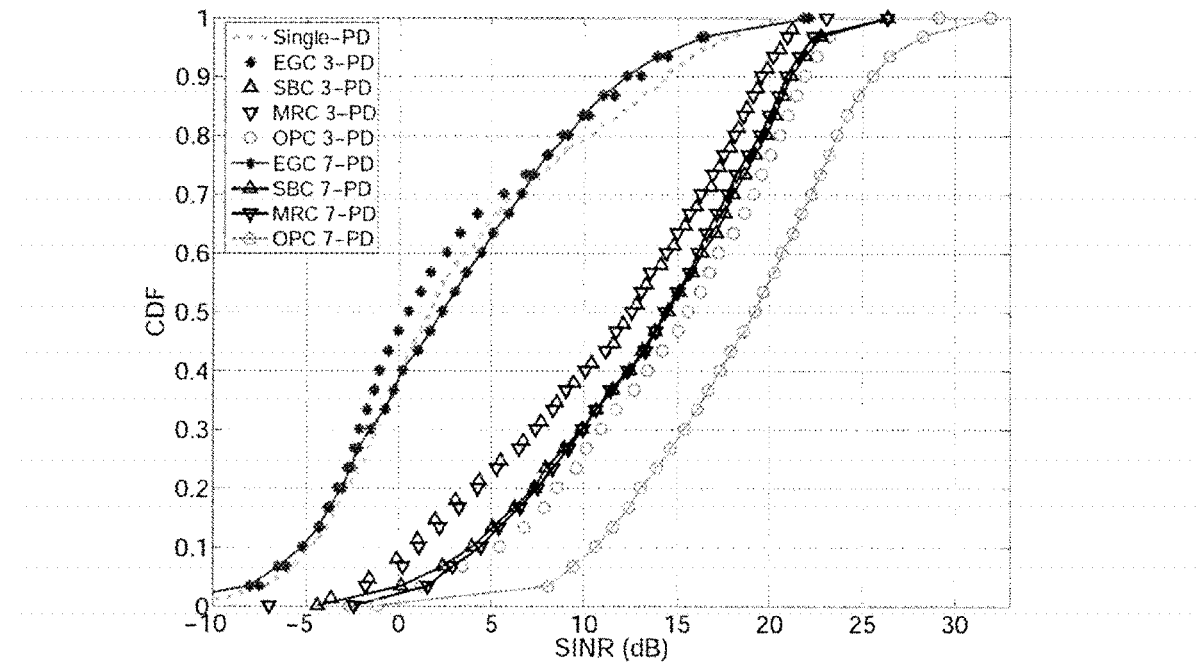
FIG. 5 is a graph of signal to noise ratio (SINR) vs cumulative distribution function (CDF) for different combining schemes using a 7-LED access point.

FIG. 5 is a simulation of the same scenario as when 7-LED transmitter configurations are used. Results of this scenario were also similar to the results of 3-LED configurations. In this scenario SBC and MRC show the same performance. This behavior can be explained by the fact that, due to the large tilt angle between PDs, they are oriented in different directions and do not receive direct signals from the same LEDs. Therefore, the use of data from other PDs does not improve SINR, i.e., MRC gives the same weight to PDs as SBC.

In FIGS. 6a to 6d, 5% and 50% SINR performances of different transmitter and receiver configuration pairs are illustrated. 5% SINR means the lowest 5% value among all SINR values in the room. While %5 captures the low SINR region, 50% gives the overall median of SINR distribution. In all of FIGS. 6a to 6d, a solid line indicates a single-PD receiver, a dashed line indicates a 3-PD, and dot-dashed line indicates a 7-PD receiver. There are two lines for each scenario, with the higher one representing a 50% SINR and the lower one representing 5% SINR. An optimal combining scheme is used for all scenarios at multi-element receivers, as it maximizes SINR in nearly all cases.

Figure 6A:
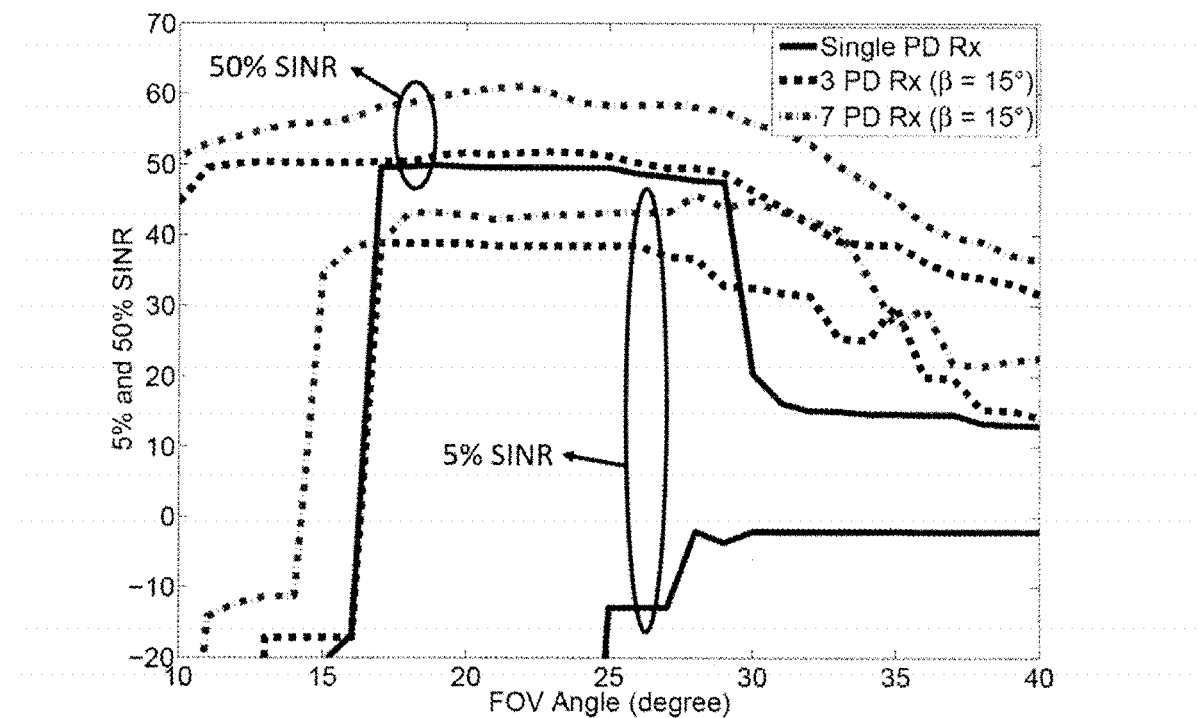
FIG. 6a is a graph showing 5% and 50% SINRs with different fields of view (FOVs) for a single-LED transmitter.
Figure 6B:
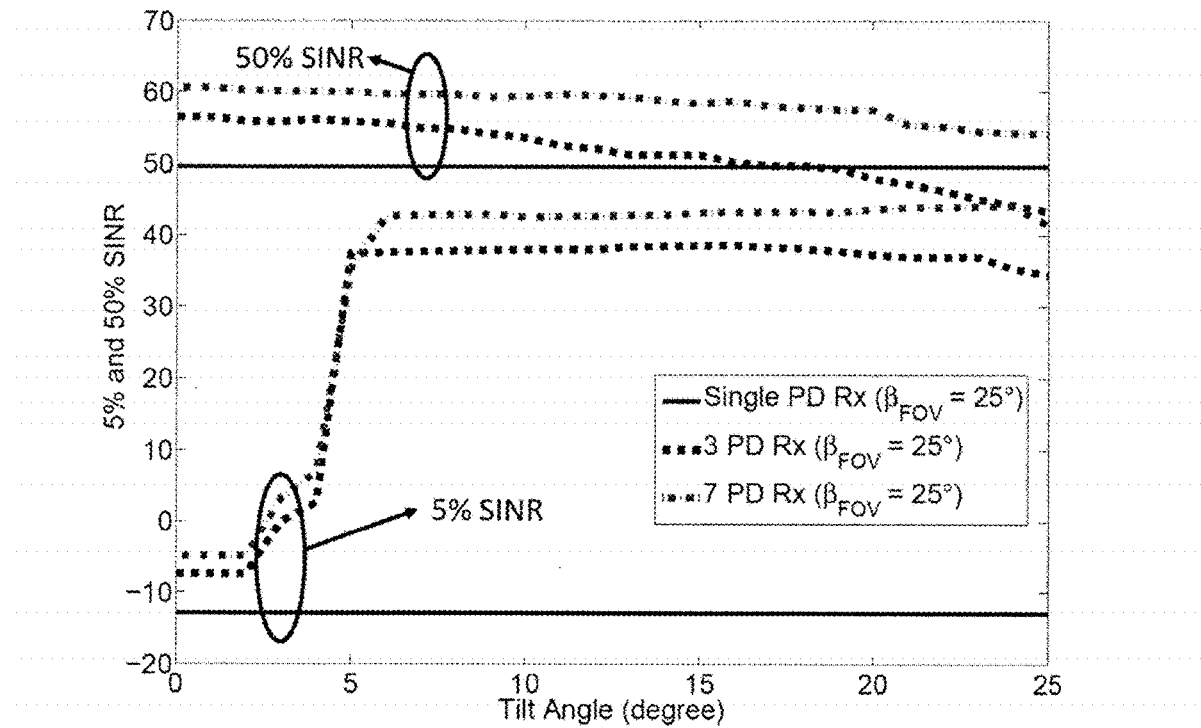
FIG. 6b is a graph showing 5% and 50% SINRs with different tilt angles for a single-LED transmitter.

In FIG. 6a and FIG. 6b, a single-LED transmitter configuration is evaluated. FIG. 6a compares performance of receivers for different FOVs. With a single-PD receiver, while a narrower FOV is generally better for high SINRs, its performance is significantly degraded for low SINRs. Narrower FOVs may prevent interference and give fairly good SINRs on average; however, they are unstable and do not perform well for low SINR regions. For seamless connection to access points (Aps), at least 28° FOV is preferred. This same rule of thumb is also valid for the 3-PD and 7-PD receivers. The 5% SINR drastically changes at a threshold value, which is 16° for 3-PD receivers and 14° for 7-PD receivers. Three-PD receivers show good performance for FOVs between 16° and 25°. Likewise, 7-PD receivers show good performance for FOVs between 18° and 29°. To maintain high levels of SINR overall, an angle of about 23° is preferred in some embodiments of the present invention since it maximizes 50% SINR, while for seamless connection 28° is preferable because it maximizes 5% SINR.

FIG. 6b compares the performance of different tilt angles of multi-element receivers, which is the angle between the LEDs and the normal of the receiver. When the tilt angle is equal to zero, all the PDs are oriented in the same direction, resulting in no significant gain compared to a single-PD receiver. There is only a limited gain because of increased receiver surface area. When there is a sufficient tilt angle, around 40 dB of gain in SINR is seen in the 5% SINR region.

Figure 6C:
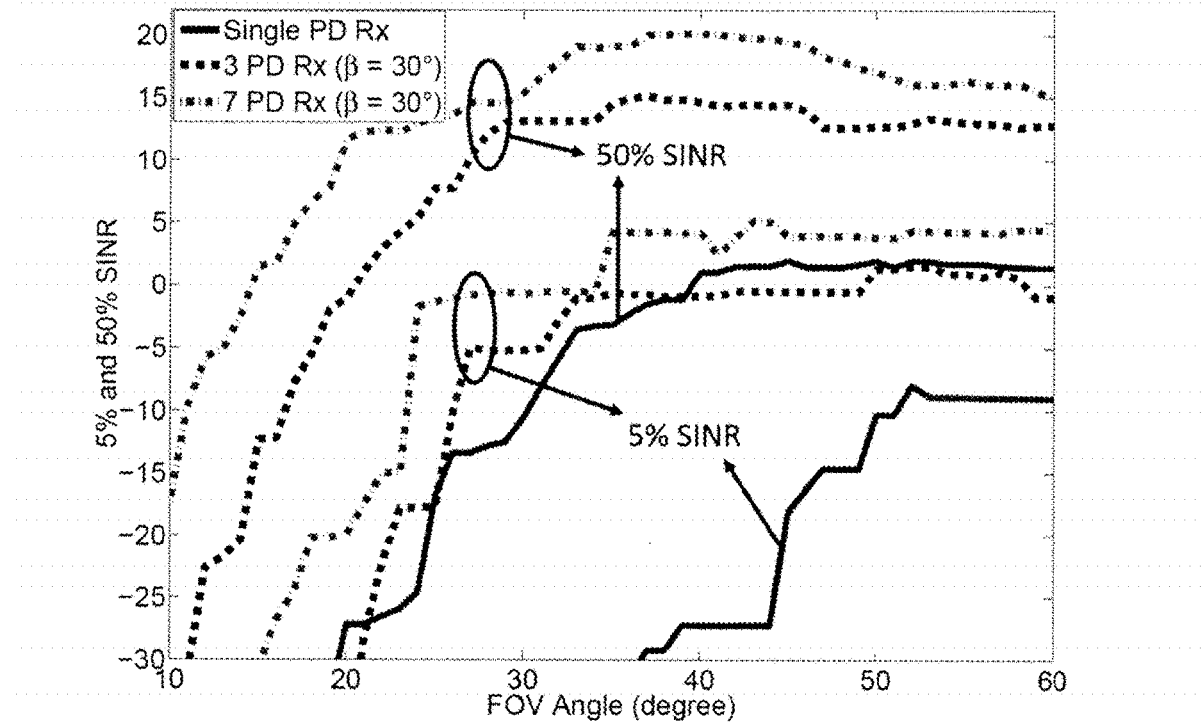
FIG. 6c is a graph showing 5% and 50% SINRs with different fields of view (FOVs) for a 7-LED transmitter.
Figure 6D:
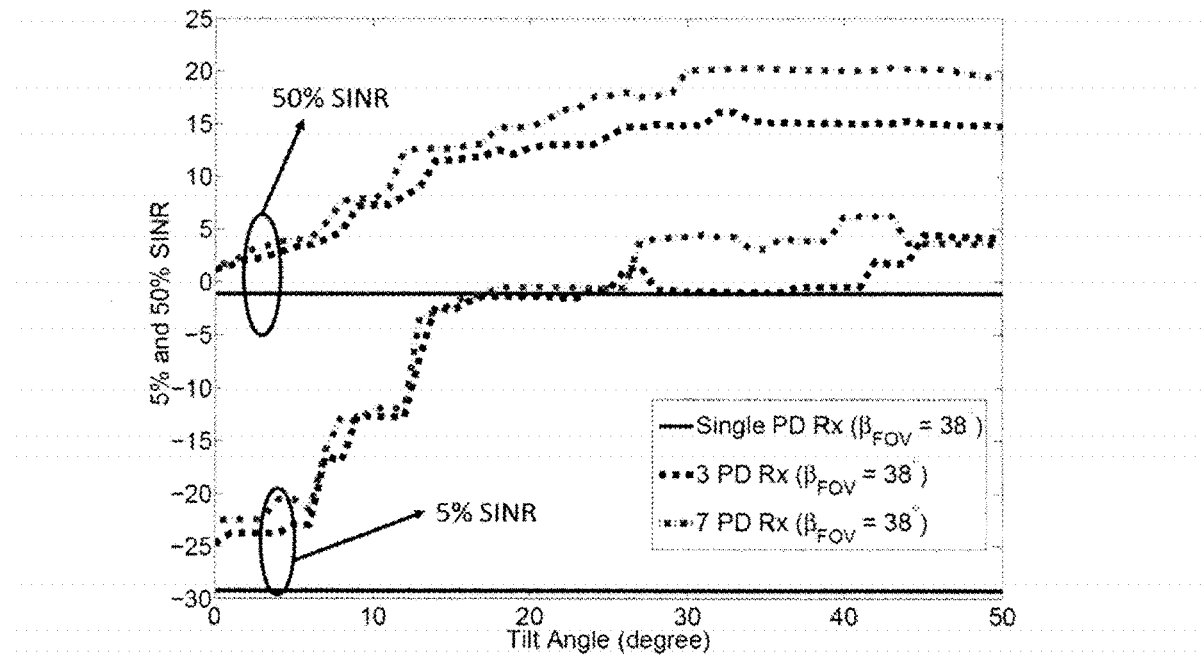
FIG. 6d is a graph showing 5% and 50% SINRs with different tilt angles for a 7-LED transmitter.

FIG. 6c and FIG. 6d compare the performance for different FOV and tilt angles. However, in this case, 7-LED multi-element transmitter configurations are used. In single LED scenarios, light was always coming from the ceiling down vertically, and there was an access point (AP) each 1.5 meters. This makes narrow FOVs and small tilt angles the best option, since they receive the most signal from the desired LED, and do not receive much interference from the neighboring LEDs. At this point, it should be noted that the receiver is always assumed to be looking upwards. However, in 7 LED transmitter scenarios, there is only a small probability of the receiver being directly under the AP, since there is a significant difference between the APs. And, because of the tilt of the LEDs, light will come from different angles in most regions. Eventually, FOV and tilt angle giving the optimal SINR will be much wider than the previous case, in order to capture enough light.

Another observation is that the SINR values are much lower in the 7-LED transmitter scenario. Since LEDs are closer to each other in multi-element transmitters, significant interference occurs. Therefore, multi-element transmitters can result in decreased SINR performance. However, with the use of multi-element receivers, SINR can be maintained at satisfactory levels. For example, in FIG. 6c, when FOV is in the 38°-40° range, 5% SINR is 5 dB, and median SINR is 21 dB, which is sufficient for high rate data transmission.

In order for a 7-PD receiver to give good SINR, FOV should be at least 24°, and in some embodiments of the present invention the ideal ranges are from 38°-40° and 42°-43°. For a 3-PD receiver, more than 27° gives good SINR, while the optimum range is 36°-40°. For a single-PD receiver, around 53° is optimum, but any FOV between 52°-60° gives similar results. In FIG. 6d, multi-element receivers with tilt angles of over 28° give acceptable SINRs, while preferred ranges are approximately 40°-43° for the 7-PD receiver and 44°-46° for the 3-PD receiver.

Summarizing the general principles of the embodiments of the present invention, although narrow FOVs give overall higher SINR in some scenarios, the SINR drops drastically on low SINR regions, and a larger FOV is required to capture light from different angles. There is a minimum limit for tilt angle to provide sufficient angle diversity, which changes based on used transmitter structure, and the required FOV and tilt angle is much larger for multi-element transmitter configurations or, in general, for the cases in which the light comes from varying angles.

Figures 2A, 2B:
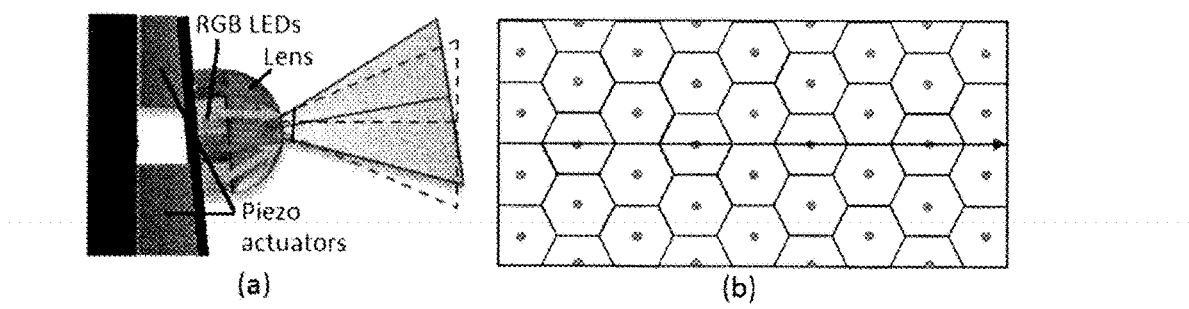
FIG. 2a is an illustration of beam steering using a piezo-electric actuator.
FIG. 2b is an illustration showing the trajectory used for beam steering according to an embodiment of the present invention.
Figure 7:
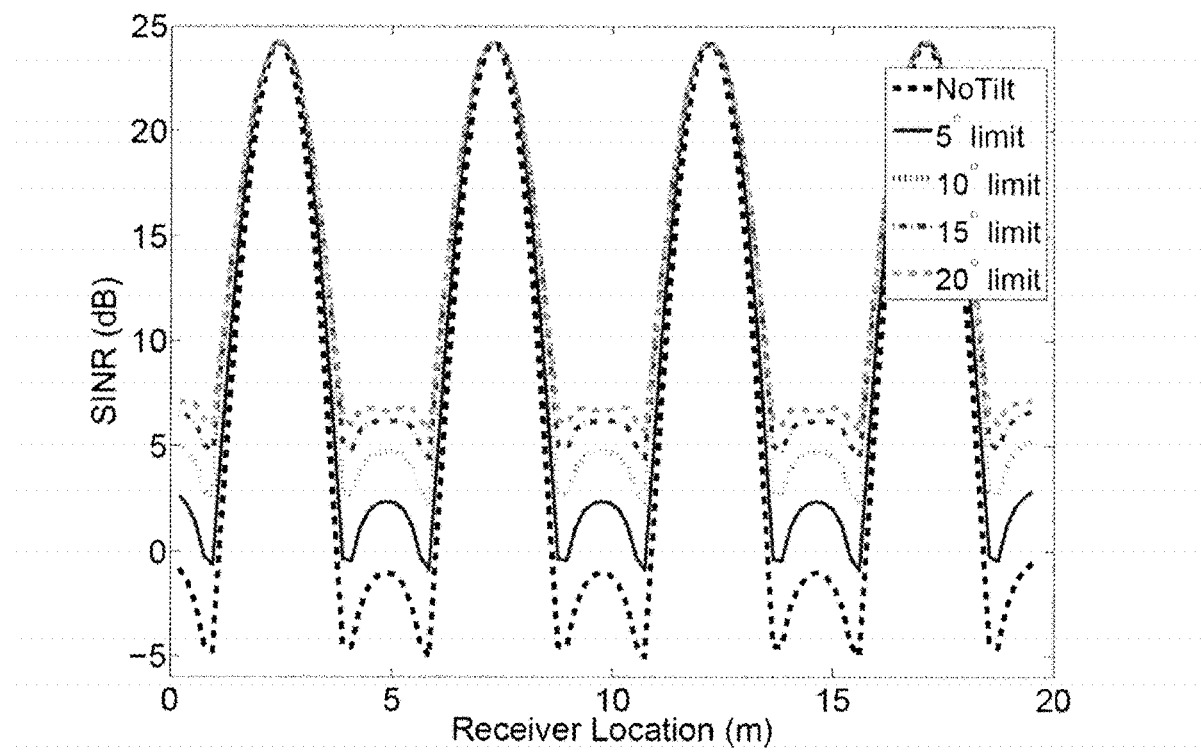
FIG. 7 is a graph of SINR vs receiver location for various beam steering scenarios.
Figure 8:
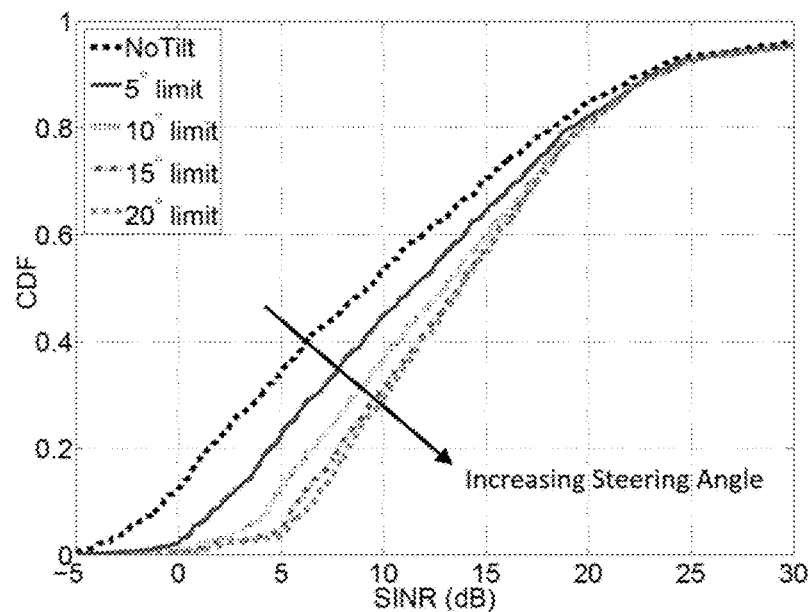
FIG. 8 a graph of CDF vs SINR for different beam steering scenarios.
Figure 9:
FIG. 9 is a schematic rendering of a VLC-RF hybrid wireless ecosystem.

In FIG. 7, an SINR distribution of the path illustrated in FIG. 2b is shown. In FIG. 7, locations with high SINR correspond to regions beneath LEDs where no steering is required. In low SINR regions, which correspond to cell limits, gain caused by beam steering is more visible. Without steering, SINR drops to -5 dB levels. When a maximum of 5° of steering is applied, SINR is always higher than -1 dB, which means a 4 dB gain. When the steering limit is increased to 10°, SINR gain is 7 dB in the lowest SINR region. When more steering is applied, gain increases asymptotically. There is no significant gain difference between 20° steering limit and more. In FIG. 8, the CDF of the SINR throughout the room is illustrated. Likewise, SINR is improved in all low and median SINR regions.

The biggest advantage of beam steering in VLC is it increases signal power, especially in low SINR regions and cell edges. With beam steering, SINR level differences between low and high SINR regions are less, which is important for seamless communication. It is also important to have a good SINR at cell edges, since it will help for a softer handover between VLC APs. A disadvantage of beam steering is the cost of piezoelectric actuators and driving circuits, which becomes greater as steering ability increases.

Embodiments of the present invention propose the use of directionality that is inherent in VLC, which does not impose any additional hardware requirements. In this approach, a node can calculate its location given that it has two neighbors that know and advertise their own location and interface normals in the packets that they transmit. Methods and apparatuses according to embodiments of the present invention are lightweight in comparison to range-based methods since they only require two localized neighbors and do not involve a complex tuning phase. This optical localization technique can also improve the aggregate capacity by allowing spatial reuse of VLC bands and the quality of the hand-over.

Novelties of embodiments of the present invention include joint design of illumination modules with multi-elements (for redundancy) and spherical structures (for spatial reuse and uniform illumination) considering both illumination and communication needs and constraints, adaptive intensity control for energy saving and chromacity control over red-green-blue (RGB) LEDs, transceiver design with varying field-of-view (FOV) and/or divergence angle, automatic realignment protocols (via electronic steering and focusing) for mobility, cognitive algorithms for transceiver selection—similar to channel selection in cognitive radio, and multi-element optical wireless localization with high accuracy.

Embodiments of the present invention include an SDR-based hybrid WiFi-LTE-VLC access point (AP) device with the capabilities of adaptive switching, optical indoor localization as well as illumination with IP generation. Embodiments of the present invention further include multi-element transmitter designs, multi-element diversity combining at the receiver, piezoelectric based dynamic beam steering for improved connectivity and SINR, accurate location estimation with multi-element LEDs and software defined hybrid RF/VLC prototype development, with on-the-fly configurable modulation, dimming, localization, and LED association parameters. Multi-element transmission techniques such as Alamouti coding, transmit beamforming or singular value decomposition precoding can be incorporated. However, when the number of users is high, and many users need to be served from the same AP, the use of multi-element receivers may be necessary to prevent negative effect of interference and to improve SINR. Since VLC can provide highly accurate localization information, this location information can be used for beam steering to further enhance communication performance. By manipulating the orientation of light sources, a gain in the SINR is possible, especially when LEDs with higher LED modes are used.

Embodiments of the present invention include hybrid utilization of angle-of-arrival (AOA) and received signal strength (RSS) information for VLC systems for 3D localization. Embodiments may further include AOA-based localization methods allowing for receivers to locate themselves via a least squares estimator by exploiting the directionality of the LEDs. Embodiments of the present invention also include improving the positioning accuracy of AOA-based localization using a weighted least squares solution and RSS-based localization. In order to deal with the system of non-linear equations for RSS-based localization, an analytical learning rule based on the Newton-Raphson method may be included. The non-convex structure is addressed by initializing the learning rule based on location estimates, and a random report and cluster algorithm. As a benchmark, an analytical expression of the Cramer-Rao lower bound (CRLB) for RSS-based localization is also derived that captures any deployment scenario positioning in 3D geometry.

Figure 10:
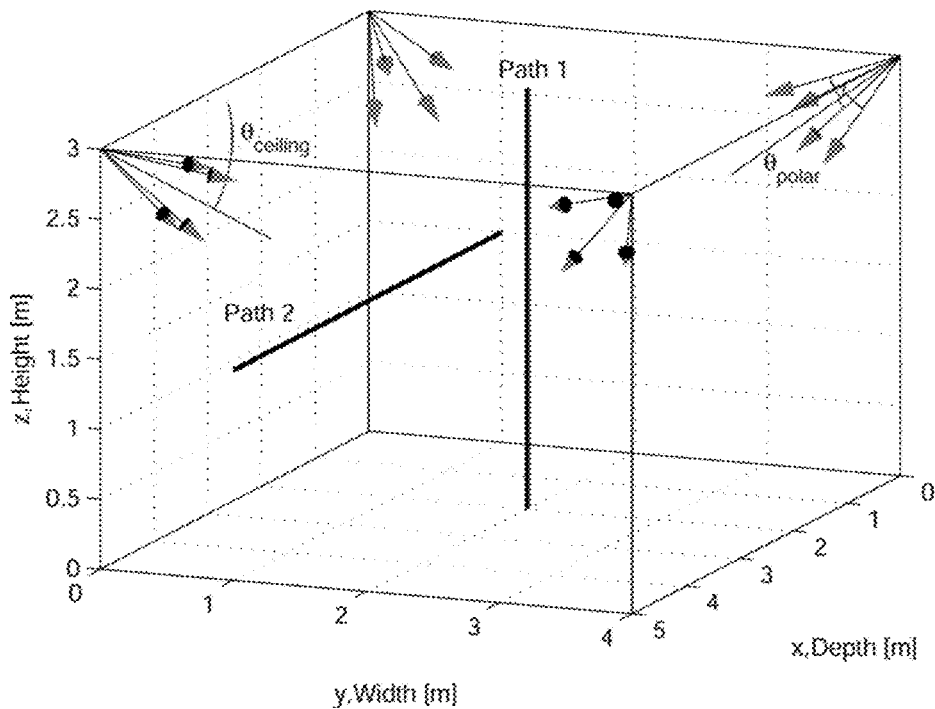
FIG. 10 is a schematic rendering of a multi-LED localization scenario.

For simulation tractability, an empty room is considered where its depth, width, and height are set to 5, 4, and 3 meters, respectively, as shown in FIG. 10. It is assumed that there are 4 access points located at the corners of the room. The angle between the direction of the access point and ceiling is denoted by $\theta_{ceiling}$. Each access point has 4 LED transmitters where the angle between the direction of access points and the direction of LED transmitters is assumed to be identical. Results in FIG. 11 for Path 2 in FIG. 10 show that a hybrid localization approach simultaneously using AOA and RSS information will result in 3D localization accuracies lower than 10 centimeters.

Embodiments of the present invention can include link-level modulation schemes such as on-off keying (OOK), pulse amplitude modulation (PAM), pulse position modulation (PPM), and OFDM, all of which can maintain link-level communications between two USRPs. Embodiments of the present invention can also include an RF/VLC SDR that can simultaneously operate in RF and VLC bands. For RF communications, an OpenAirInterface open source platform can be used to achieve LTE communications. Adaptive switching between VLC and LTE technologies can also be incorporated in an opportunistic manner; i.e., when the VLC link is blocked (e.g., due to obstructions), the hybrid RF/VLC prototype will switch to LTE communications, and will move back to VLC communication as soon as it becomes available again. This can help in opportunistically offloading traffic from an LTE network to a VLC network.

Embodiments of the present invention may use a high number of LEDs installed in the medium and one LED should optimally not serve more than one user at a time. On the other hand, the proposed technique also extends to scenarios where one LED can be assigned to more than one user, for example, using non-orthogonal multiple access (NOMA) based methods. Since there is a hardware frequency restriction on LEDs, which limits the throughput, traditional orthogonal division methods will decrease the throughput of VLC users. To install many LEDs that can transmit data independent from each other, multi-element VLC transmitters can be used. In this case, assignment of LEDs to user needs to be done optimally to maximize throughput.

Figure 11:
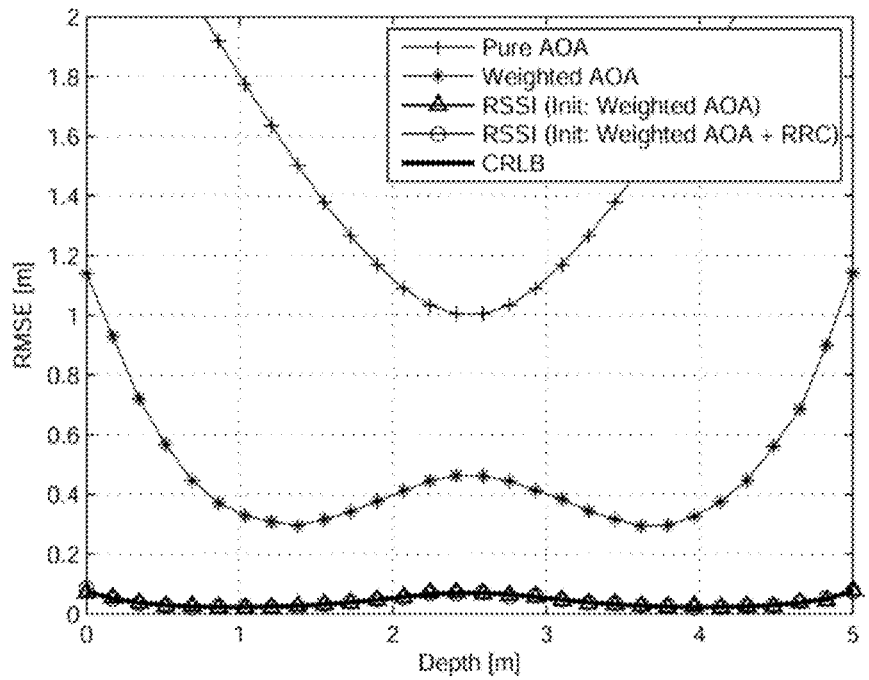
FIG. 11 is a graph illustrating positioning accuracy for Path 2 of FIG. 10 for different localization techniques and for the Cramer-Rao lower bound (CRLB).
Figure 12:
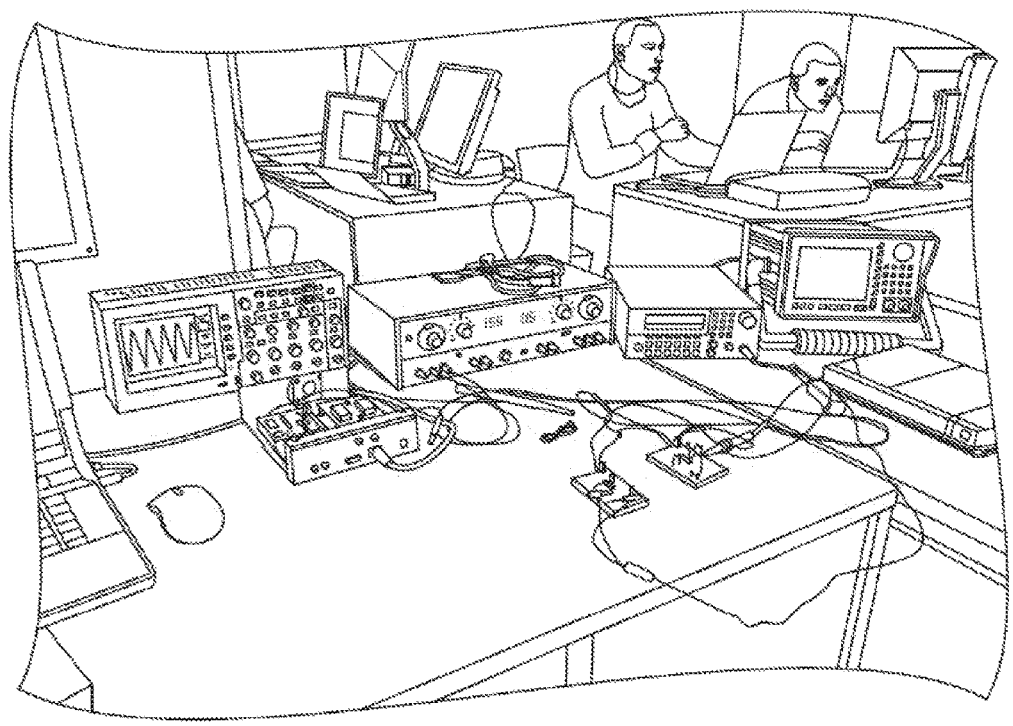
FIG. 12 is an image of a link-level VLC communications testbed.
Figure 13:
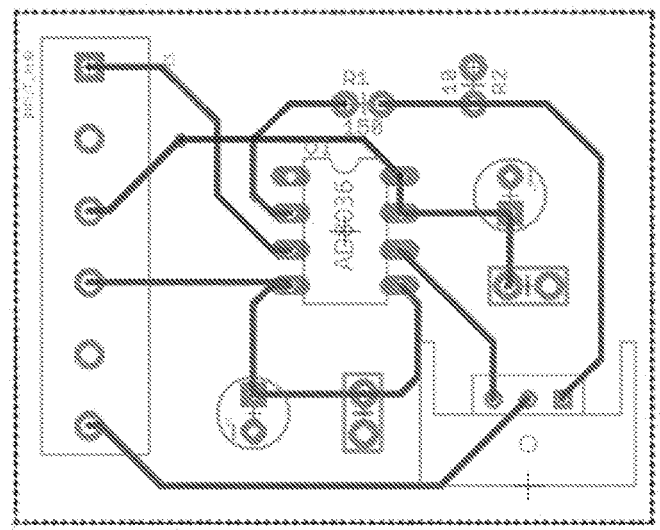
FIG. 13 is a schematic diagram of a PCB that is used as a front-end for USRPs to feed LEDs for a software defined radio (SDR) testbed.
Figure 14:
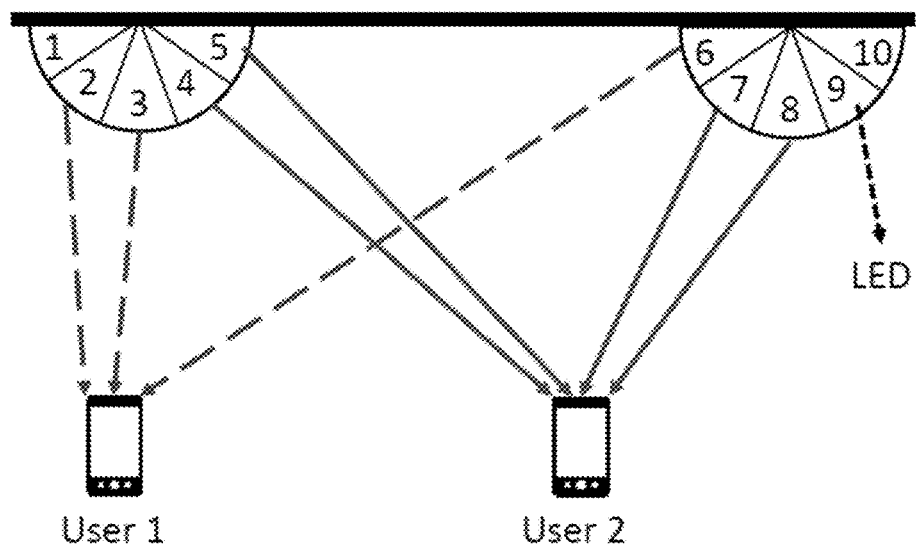
FIG. 14 is a simplified example of assigning multiple LEDs to two different users.

In the following analysis it will be assumed that there are $N_U$ users in the room, $N_L$ number of LEDs to serve the users, and $N_L \gg N_U$. In FIG. 11, these conditions are illustrated. There are two multi-element transmitters which includes five LEDs each. A simple assignment of LEDs to users would be assigning the first multi-element transmitter to user 1, and the other one to user 2. However this is not the optimal assignment, and by mixed assignment of LEDs to users, a better communication channel can be obtained. Embodiments of the present invention can find the optimal assignment which will maximize total log-throughput to provide both fairness and high overall throughput. To model this problem, the SINR of each user is calculated. SINR of the ith user is calculated as $$SINR_{(i)} = \frac{\left(\sum_{j=1}^{N_L} \alpha(j,i)P_{j,i}\right)^2}{N_0 B + \sum_{j=1}^{N_L} (1-\alpha(j,i))P_{j,i}^2}, \quad (8)$$

where $P_{j,i}$ is the signal strength that ith user receives from jth LED, $N_0$ is the spectral density of the additive white Gaussian noise (AWGN), and B is the communication bandwidth. The numerator represents the received total signal power, the second part of the denominator represents interference, and $\alpha(j, i)$ is equal to one when the jth LED is connected to ith user, and is equal to 0 otherwise.

$$\alpha(j,i) \triangleq \begin{cases} 1 & \text{if } j\text{th LED serves } i\text{th user} \\ 0 & \text{if } j\text{th LED does not serve to } i\text{th user} \end{cases} \quad (9)$$

This results in a matrix of a(j, i)s such that:

$$A = \begin{bmatrix} \alpha(1,1) & \alpha(1,2) & \ldots & \alpha(1,N_U) \\ \alpha(2,1) & \alpha(2,2) & \ldots & \alpha(2,N_U) \\ \vdots & \vdots & \ddots & \vdots \\ \alpha(N_L,1) & \alpha(N_L,2) & \ldots & \alpha(N_L,N_U) \end{bmatrix} \quad (10)$$

The sum of a row of A cannot exceed 1, since one LED can only serve one user at a time. Then, maximizing the total log-throughput problem (which is known to achieve proportional fairness in the literature) is expressed as follows:

$$\hat{A} = \underset{A}{\mathrm{argmax}} \sum_{i=1}^{N_U} \log(\log(1+SINR_{(i)})), \quad (11)$$

with the constraint $$\sum_{i=1}^{N_U} \alpha(j,i) \le 1, \quad (12)$$

and $\alpha(j, 1)$ is either 0 or 1.

Solving for (3) under the constraint (4) is not an easy problem, and embodiments of the present invention include methods and apparatuses for achieving this goal. In order to know the link qualities of all users at each of the LEDs, embodiments of the present invention can include a new protocol. Since LEDs can only transmit and cannot receive, and any photo detectors placed in the transmitter will violate channel reciprocity, embodiments of the present invention can include a channel quality reporting mechanism from users to access points. In particular, each LED can periodically transmit a training sequence, and users can periodically send a channel quality indicator report back to the transmitters. Knowing the channels from all users at all LEDs, an LED grouping algorithm can be applied to satisfy (1).

Figure 15:
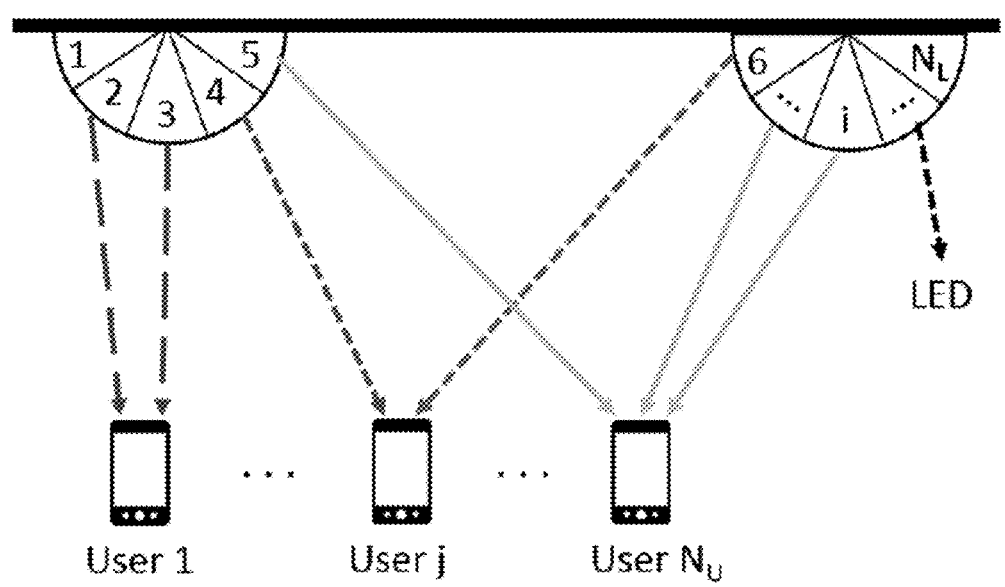
FIG. 15 is a simplified diagram for assigning multiple LEDs to $N_U$ number of user using $N_L$ number of LEDs.

To help explain the concepts of the present invention, consider a room where $N_U$ users served by $N_L$ LEDs such that $N_L \gg N_U$, as illustrated in FIG. 15. For the example scenario in FIG. 15, an assignment strategy in which each user is connected to a multi-element transmitter with highest received power can be implemented. However, this may not be the optimal assignment strategy, as a better communication channel can be observed by following a mixed LED assignment strategy. Embodiments of the present invention can find assignments that maximize total logarithmic throughput, which is known to achieve proportional fairness. To model this problem, the signal to noise ratio (SINR) of each user can be calculated. In particular, when more than a single LED is assigned to a user for a given assignment, the SINR of the jth user can be expressed as:

$$SINR_{(j)} = \frac{\left(\sum_{i=1}^{N_L} \alpha(i,j)P_{i,j}\right)^2}{N_0 B + \sum_{i=1}^{N_L} (1-\alpha(i,j))P_{i,j}^2}, \quad (13)$$

where Pi;j is the signal strength that the jth user receives from ith LED, $N_0$ is the spectral density of the additive white Gaussian noise (AWGN), and B is the communication bandwidth. The numerator represents the received total signal power, and the second part of the denominator represents the interference. (i; j) is the connectivity variable, which is equal to 1 when ith LED is assigned to a jth user, and equal to 0 otherwise:

$$\alpha(i,j) \triangleq \begin{cases} 1 & \text{if } ith \text{ LED serves } jth \text{ user} \\ 0 & \text{if } ith \text{ LED does not serve to } jth \text{ user} \end{cases} \quad (14)$$

Then, a connectivity matrix A can be constructed as given by:

$$A = \begin{bmatrix} \alpha(1,1) & \alpha(1,2) & \cdots & \alpha(1,N_U) \\ \alpha(2,1) & \alpha(2,2) & \cdots & \alpha(2,N_U) \\ \vdots & \vdots & \ddots & \vdots \\ \alpha(N_L,1) & \alpha(N_L,2) & \cdots & \alpha(N_L,N_U) \end{bmatrix}. \quad (15)$$

The sum of a row of A cannot exceed 1 since one LED should only serve one user at a time. Then, the problem of maximizing the total logarithmic throughput can be expressed as follows:

$$\hat{A} = \arg\max_A \sum_{j=1}^{N_U} \log(\log(1 + SINR_{(j)})), \quad (16)$$

such that $$\sum_{j=1}^{N_U} \alpha(i,j) \leq 1 \; \forall i, \quad (17)$$

where $\alpha(i,j) \in \{0,1\}$. From this point the problem in (16) will be referred to as an LED assignment problem.

It will be shown that the LED assignment problem is NP-hard, which means there is no algorithm available for finding the optimum solution in polynomial time, unless P=NP. NP-hard problems can be solved via exhaustive search; however, when the number of elements increases, runtime for exhaustive search becomes too large to handle, even for a fairly small number of elements. For example, for the LED assignment problem, considering that the LEDs can also be idle (not assigned to any user), there are $(N_U+1)^{N_L}$, different possible assignments of $N_L$ LEDs to $N_U$ users, which will make exhaustive research unfeasible even for a small number of LEDs and users. One may find more efficient solutions than exhaustive search; however, it is difficult to find a solution that has a runtime proportional to a polynomial function of this problem size. To give an example, an algorithm with runtime $O(N_U^2)$ is polynomial time, but an algorithm with a runtime of $O(2^{N_U})$ is not, as the runtime is proportional to the logarithmic function, which takes much longer for a large N.

A reduction method will be used to prove the NP-hardness of the problem. The reduction is based on a 3-dimensional matching problem that is known to be NP-complete. If the LED assignment problem can be reduced to a 3-dimensional matching problem, it means that the LED assignment problem is at least as hard as the 3-dimensional matching problem, which will satisfy the condition to be NP-hard. The definition of 3D matching problem is as follows.

Let there be three disjoint sets, $U=\{u1, \ldots, u_n\}$, $V=\{v1, \ldots, v_n\}$, $W=\{w1, \ldots, w_n\}$ and let $T=\{T1, \ldots, T_m\}$ be a subset of U×V×W as in FIG. 16. That is, T consists of triples $(u_\lambda, v_\mu, w_\nu)$ such that $u_\lambda \in U$, $v_\mu \in V$ and $w_\nu \in W$. The problem is to find a matching $M \subset T$ which has disjoint elements and covers all U, V and W. The solution to the 3D matching problem should have exactly n triples. Therefore, the problem has no solution if m<n. It is easy to check the solution when m=n, so it will be assumed that m>n.

In the reduction, set U of the 3D matching problem corresponds to the user LED assignment problem, and likewise set V and set W corresponds to two different sets of LEDs. In the LED assignment problem, let there be n users, which correspond to n elements of set U. For the purpose of making the proof tractable, let there be 2n LEDs, which corresponds to 2n elements of V∪W. It will be assumed that each user receives nonzero signal power from some number of LEDs, which is larger than 2. It will also be assumed that all users receive the same magnitude of signal power from all LEDs that are available to them.

Let R be the rate of a user when only one LED is assigned to that user, which is taken as a constant for tractability of the proof. When more than one LED is assigned to a user, due to transmit diversity, there will be a power gain and SINR will increase. Due to the increase in SINR, the throughput will also increase. Let the throughput gain due to use of η LEDs be denoted by (η)R. Notice that β(1)=1, and β(η)<β(θ) when η<θ. It can also be shown that $$\frac{\beta(\eta)}{\eta} > \frac{\beta(\theta)}{\theta}$$

when η<θ. This means that increasing the number of LEDs serving a user will increase the rate, but with a smaller ratio than an increase in the number of LEDs. This is because rate does not increase proportionally with SINR, but increases proportionally to log (1+SINR), which is a slowly increasing function.

With all these given conditions and assumptions, if such an assignment exists, the best assignment should assign two LEDs per user. Otherwise, if a user has one LED, and the other has three, the sum throughput can be improved by switching one LED to the single LED user, since when $$\eta < \frac{\beta(\eta)}{\eta} > \frac{\beta(\theta)}{\theta} \theta.$$

Assigning an equal number of LEDs to each user will also improve (16), since the sum of logarithmic throughputs strictly depend on users with the least throughput.

Assume that users receive less signal power from LEDs represented with W in comparison to V. In this case, if such an assignment exists, the best assignment should consider one LED from V, and one LED from W to each user. To understand this concept, consider the following numerical example. Assume that there are four LEDs and two users, and the users receive 2 units of signal power from two LEDs, and one unit of signal power from the other two LEDs. To maximize (16), one weak and one strong LED needs to be assigned to each user. Assuming interference and noise is constant and equal to one unit, then (16) will be 2×log(log (1+(1+2)²))=1:04. If both strong LEDs are assigned to one user, and weaker LEDs to another, the calculation will be log(log(1+(2+2)²))+log(log(1+(1+1)²))=0:97. As seen in this example, logarithmic throughput yields worse results when there is a weaker user, and the best implementation may be distributing sources equally. This assumption should hold for all signal power levels.

Assuming a solution exists for the 3D matching problem, a solution exists for the LED assignment problem such that each user is assigned one LED from V and one LED from W. In this case, as with previous restrictions, the problem is equivalent to a 3D matching problem.

The solution to the LED assignment problem is assigning one LED from V and one LED from W to each user, which will maximize logarithmic throughput. T corresponds to nonzero connections between LED couples and users, and assignments from T need to be chosen. Since the LED assignment problem can be reduced to a 3D matching problem, it can be assumed that it is at least as hard as a 3D matching problem.

Since the LED assignment problem is proven to be NP-hard, there is no algorithm that can solve the problem in polynomial time. In this case, in order to find a solution in a reasonable amount of time, suboptimal or heuristic algorithms can be applied.

Embodiments of the present invention can include algorithms for initial assignment including a highest RSS based assignment and a weighted signal power based assignment. In the highest RSS based assignment, each LED can be assigned to a user that receives the highest received signal strength (RSS) from that LED. This is the simplest algorithm and gives the highest sum throughput; however, it fails in fairness criterion. The runtime of this algorithm is $O(N_L \times N_u)$. This method can be referred to as HR-based assignment. In weighted signal power based assignment, received signal power is scaled with the inverse of the total received power by that user. In particular, the weighted signal power for the ith LED by jth user is given by $$P_{i,j}^W = \frac{P_{i,j}^2}{\sum_{k=1}^{N_L} P_{k,j}^2}. \quad (18)$$

Afterwards, each LED is assigned to the user with highest weighted signal power. Since this algorithm considers proportional signal power, it is more fair compared to the HR-based assignment algorithm. The runtime of this algorithm is $O(N_L^2 \times N_U)$ and this method will be referred to as WSP-based assignment.

One issue with these two algorithms is that they may not guarantee service to all users. Since the assignments are done heuristically, without necessarily assigning a minimum amount of resources to each user, many users may not be assigned any LEDs at all. For example, if there are users closer to the LEDs, LEDs will be associated with these users and no LED may be assigned to the distant users. Notice that in this case the objective function will be minus infinity. In other words, if any of the users has no LED, that user will have zero throughput, and the logarithm of the profit function will be minus infinity. Initial assignment algorithms may yield high overall throughput, and even a good fairness index; however they are not sufficient to maximize (16). To make sure every user is assigned sufficient resources, the present invention may include a "greedy" algorithm to complement one of the initial assignment algorithms.

A greedy algorithm of the present invention is a heuristic algorithm that can continuously make adjustments to the VLC network based on net overall results. A potential approach to the existing problem is to make decisions for each LED assignment based on a maximum contribution to the objective function in (16). Using the greedy algorithm for initial assignment is not always efficient, since the result is highly dependent on the order in which LEDs are assigned. However, the greedy algorithm can improve existing assignments. After the first assignment is done with any of the initial assignment algorithms, the greedy algorithm can be used to maximize sum logarithmic throughput. This algorithm keeps changing LED assignments virtually and, if there is increase in log sum throughput, confirms the assignments, as described in Algorithm 1. The changes can be performed until there are no further increases in the objective function. The greedy algorithm can converge on a local maximum in a few iterations. If such an assignment is possible, it will provide an assignment such that no user has zero throughput.

Algorithm 1 Greedy Algorithm

1: Sort users w.r.t. their throughput, ascending order.
2: Sort LEDs w.r.t. their received signal strength for each user, descending order.
3: do
4:   for j = 1 : $N_U$
5:     for i = 1 : $N_L$
6:       If sum logarithmic throughput increases when ith LED is assigned to jth user, do the assignment.
7:     end
8:   end
9: while an increase in sum logarithmic throughput is provided A possible improvement to the greedy algorithm is to limit the number of iterations in line 5 to a lower number than $N_L$. Since the algorithm will only check for the LEDs with higher signal strengths, it is more likely that the objective function will converge to a higher point. In this case, it will not necessarily serve all the users, but a sufficiently large limit can be found such that all users will be served and the objective function will be maximized. Another potential issue with the greedy algorithm is a minus infinities error. In line 6 and 9, it is determined whether there is an improvement after the assignment. If there are users with zero throughput, the output of the objective function in (16) will be minus infinity. When two outputs are compared, they might both be minus infinity, and a possible improvement in the output might be missed. To prevent this, if there are zero throughput users during the comparison, the objective function can be substituted with $\Sigma_{j=1}^{N_U} \log(\gamma + \log(1 + SINR_{(j)}))$, where $\gamma$ is a sufficiently small positive number.

Figure 23:
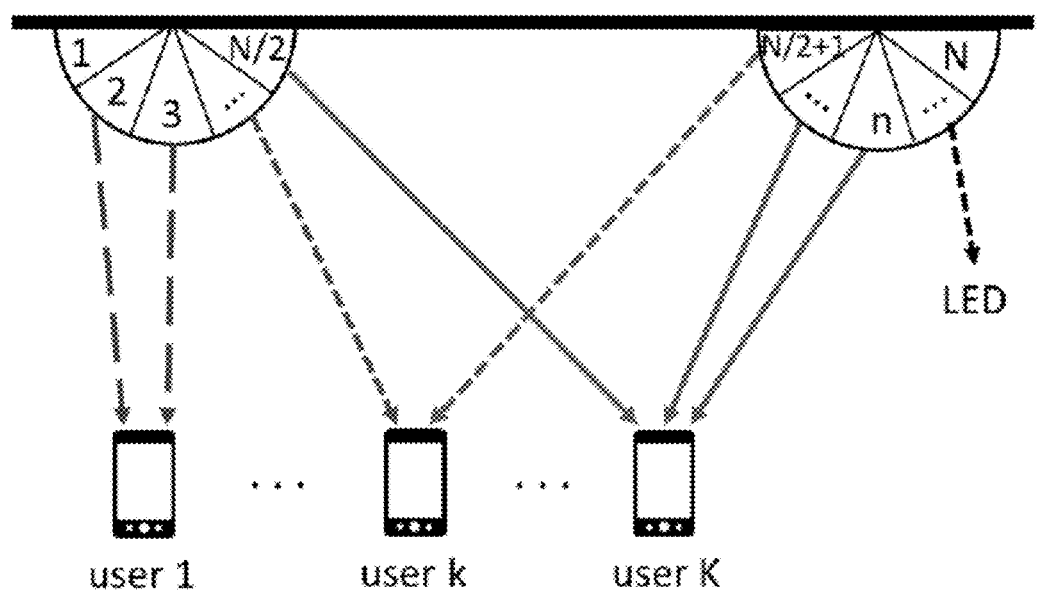
FIG. 23 is a simple example for assigning multiple LEDs to K users and N LEDs, clustered at two access points.

Consider a VLC network as shown in FIG. 23, where K users are served by N LEDs such that N»K. Users receive the signal from a source LED by a photo-detector (PD). The line of sight propagation channel between the $n^{th}$ LED and $k^{th}$ user can be described using the Lambertian model in VLC networks, which can be defined as $$h_{k,n}^{(0)} = \frac{i+1}{2\pi} \cos^i(\phi) \cos(\theta) \frac{A_R}{D^2}, \quad (19)$$

where i is the LED directivity index, $\phi$ is the angle between the source direction vector and the incidence vector, $\theta$ is the angle between the PD direction vector and incidence vector, AR is the area of the PD in m², and D is the distance between the source and the receiver. As light can reach the PD after several reflections, the total channel response due to the non-line of sight components can be written as $h_{k,n} = \sum_{j=0}^{\infty} h_{k,n}^{(j)}$, where j is the reflection order.

When more than a single LED is assigned to a user for a given case, the signal-to-interference-plus-noise-ratio (SINR) of the kth user can be improved, and expressed as:

$$SINR(k) = \frac{\left(\sum_{n=1}^{N} \alpha_{k,n} p_n h_{k,n}\right)^2}{N_0 B + \sum_{\substack{i=1 \\ l \neq k}}^{K} \left(\sum_{n=1}^{N} \alpha_{l,n} p_n h_{k,n}\right)^2}, \quad (20)$$

where $p_n$ is the transmit power of nth LED, No is the spectral density of the additive white Gaussian noise (AWGN), and B is the communication bandwidth. The transmission power of all LEDs can further be stacked in a vector $p=[p_1, \ldots, p_N]$. The numerator part represents the received total signal power from multiple LEDs serving the same user, and the second part of is denoted by $\alpha_{k,n}$, which is equal to 1 when nth LED is assigned to kth user, and equal to 0 otherwise:

$$\alpha_{k,n} \triangleq \begin{cases} 1 & \text{if } nth \text{ LED serves } kth \text{ user} \\ 0 & \text{if } nth \text{ LED does not serve to } kth \text{ user} \end{cases}. \quad (21)$$

Then, a connectivity matrix A can be constructed as follows:

$$A = \begin{bmatrix} \alpha_{1,1} & \alpha_{1,2} & \cdots & \alpha_{1,N} \\ \alpha_{2,1} & \alpha_{2,2} & \cdots & \alpha_{2,N} \\ \vdots & \vdots & \ddots & \vdots \\ \alpha_{K,1} & \alpha_{K,2} & \cdots & \alpha_{K,N} \end{bmatrix}, \quad (22)$$

which can also capture the assignment of multiple LEDs to each user. Note that the sum of column of A cannot exceed one since one LED is assumed to serve at most one user at a given time. On the other hand, the sum of each row can be more than one since multiple LEDs can serve a single user. The goal is to solve for matrix A under different optimization criteria to maximize the capacity of users considering different constraints, where the capacity of the kth user is given by $$R_k = B \log_2(1 + SINR(k)), \quad (26)$$

When there are no QoS guarantees, the goal is to maximize the total throughput while providing proportional fairness among users. It has been shown that maximizing the total logarithmic throughput achieves proportional fairness. The problem can be expressed as follows:

$$[A', p'] = \arg\max_{A,p} \sum_{k=1}^{K} \log(R_k), \quad (23)$$

subject to $0 \leq p_n \leq p_{max} \; \forall n$ $\alpha_{k,n} \in \{0, 1\}$, $\sum_{k=1}^{K} \alpha_{k,n} \leq 1 \; \forall k, n,$ where $A'$ and $p'$ are the connectivity matrix and transmit power allocation vector which maximizes the logarithmic sum capacity over all possible values of A and p, respectively, and $p_{max}$ is the maximum transmit power of an LED. Upper transmit power limit comes from the illumination requirements, and it will be assumed that all LEDs will provide the same level of illumination.

The solution of this problem maximizes the throughput while distributing LEDs in a proportionally fair manner with respect to users' channel conditions. An alternative solution is to maximize total throughput by changing the objective function from $\sum_{k=1}^{K} \log(R_k)$ to $\sum_{k=1}^{K} \log(R_k)$. While the solution maximizes the total throughput in this case, it does not consider the fairness among the users, and it will assign most of the LEDs to the users with good SINRs.

The optimization problem in (23) is generally hard to solve since it includes both discrete and continuous variables. Such problems are called binary mixed-integer programming problems. Even if it is assumed that the LEDs have identical transmission power and the focus is on the problem of assigning LEDs to users, considering that the LEDs can also be idle (not assigned to any user), there are $(K+1)^N$ different possible assignments of N LEDs to K users, which will make exhaustive search unfeasible.

The problem of assigning users to base stations for 3G networks considering proportional fairness has been shown to be an NP-hard problem, which means there is no algorithm available for finding the optimum solution in polynomial time, unless P=NP. This problem is not the same as (23). However, if the role of users and LEDs is stretched, an analogy between the two problems can be established. In 3G networks, there are large number of users and a few base stations, and one user is connected to a base station at a time. In this model, it is assumed there is a greater number of LEDs than users, and one LED will be assigned to one user at a time. It can be shown that the problems are equivalent and assigning LEDs to users is also an NP-hard problem. NP-hard problems can be solved via exhaustive search; however, when the number of elements increases, the runtime for exhaustive search becomes too large to handle, even for a fairly small number of elements. Even though one may find more efficient solutions than exhaustive search, it is difficult to find a solution with a runtime proportional to a polynomial function of the problem size. Thus, the present invention can contain heuristics that find close-to-optimal solutions.

Since the problems in (23) are too complex to find an optimal solution, some embodiments of the present invention will focus on developing suboptimal solutions. It will be assumed that the transmit power of all LEDs is equal to the maximum power: $p_n = p_{max}, \forall n$. Since a total power limit is not imposed, increasing the transmit power of an LED does not affect the power of other LEDs. Setting a lower power to an LED can be preferred in order to decrease interference to other users; however, with a good LED-to-user assignment, the effect of interference can be minimized even for $p_n = p_{max}, \forall n$. Assuming identical transmit power allocation to all LEDs, LED assignment to users will be the focus. In particular, the following LED assignment techniques are proposed and evaluated.

Highest RSS based assignment (HRS) can be applied in embodiments of the present invention when there are no QoS guarantees. In this algorithm, each LED is assigned to a user that receives highest received signal strength (RSS) from that LED. This is the simplest algorithm and gives highest sum throughput. This algorithm is the solution of maximizing the total throughput problem. The runtime of this algorithm is O(N×K).

Embodiments of the present invention can incorporate a weighted signal strength based assignment (WSS) algorithm. In this algorithm, RSS can be scaled with the inverse of the total received signal power by that user. In particular, the weighted RSS for the nth LED by kth user can be given by $$S_{n,k}^W = \frac{p_n h_{k,n}}{\sum_{m=1}^{N}(p_m h_{k,m})^2} \propto \frac{h_{k,n}}{\sum_{m=1}^{N} h_{k,m}^2} \quad (24)$$

The proportionality holds because the LED transmission powers are equal for all LEDs and can be considered constant. Afterwards, each LED can be assigned to the user with the highest weighted signal strength. This method provides a more fair allocation than just assigning each LED to the user which receives the highest signal power from that LED. This is because it takes into account the whole signal power a user can receive and gives priority to users with low overall received signal power. The runtime of this algorithm is $O(N^2 \times K)$ and the method can be referred to as WSS.

A possible improvement to this WSS algorithm is to do an exhaustive search after the WSS is implemented once. It can be done by virtually by exchanging LEDs between users, and keeping the exchange if sum log throughput increases. This additional algorithm generally converges on an optima in a few iterations. However, simulation results show that there is not a significant gain over WSS while there is an increase in the complexity of the algorithm.

Embodiments of the present invention can incorporate a proportional rate algorithm, as displayed below. Embodiments of the present invention can also incorporate a weighted signal strength algorithm, as shown in (25).

If required rates are not given, a weighted signal strength algorithm can be used to maximize the sum logarithmic throughput. The number of users is denoted by K, the number of LEDs is denoted by N, $S_{n,k}$ is the signal strength received by kth user from nth LED, $H_{n,k}=S_{n,k}^2/N_0$ is the signal to noise ratio for user k and LED n, and $\Omega_k$ is the assigned LED set of user k, and $R_k$ is the rate of user k.

In the weighted signal strength algorithm, received signal strength is scaled with the inverse of the total received signal strength by that user. In particular, the weighted signal strength for the nth LED by the kth user is given by $$S_{n,k}^W = \frac{S_{n,k}^2}{\sum_{n=1}^{N} S_{n,k}^2} \quad (25)$$

Afterwards, each LED can be assigned to the user with highest weighted signal strength.

| Proportional Rate Algorithm |
|---|
| 1: Initialization<br>a) Set $R_k = 0$, $\Omega_k = 0$ for k = 1,2, ..., K and A = {1, 2, ..., N}<br>2: For k = 1 to K<br>a) find n satisfying $|H_{k,n}| \geq |H_{k,j}|$ for all $j \in A$;<br>b) let $\Omega_k = \Omega_k \cup \{n\}$, A = A − n ans update $R_k$ according |

| Proportional Rate Algorithm |
|---|
| to (3).<br>3: While A ≠ Ø<br>a) find k satisfying $R_k/\gamma_k \leq R_i/\gamma_i$ for all i, $1 \leq i \leq K$;<br>b) for the found k, find n satisfying $H_{k,n} \geq H_{k,j}$ for all $j \in A$;<br>c) for the found k and n, let $\Omega_k = \Omega_k \cup \{n\}$, A = A − {n} and update $R_k$ according to (3), |

Figure 30:
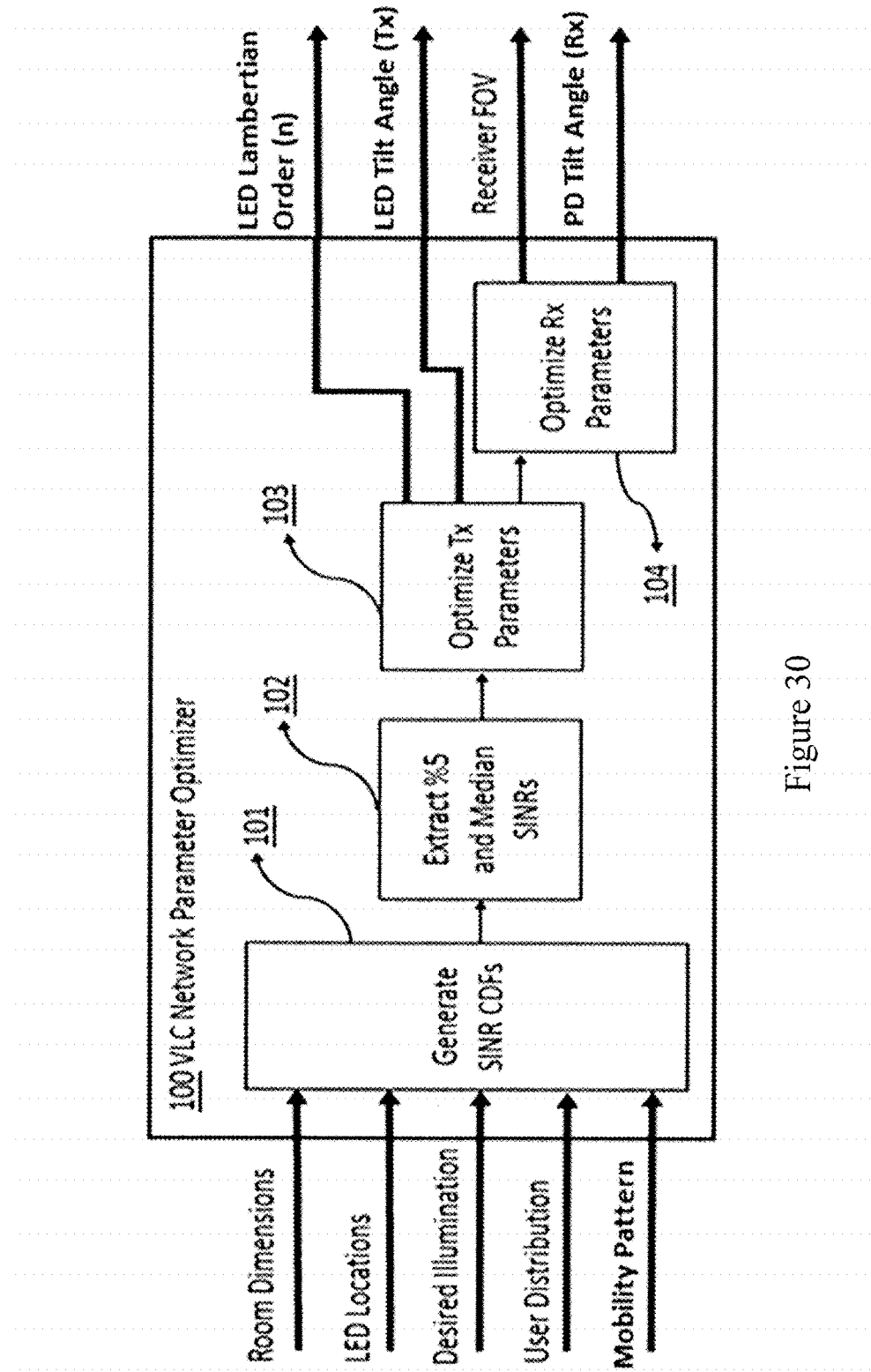
FIG. 30 is a diagram of a method for optimizing VLC according to the present invention.

FIG. 30 is a diagram of a method for optimizing VLC according to the present invention. When there is a fixed budget in terms of number of LEDs to be deployed in a given environment, it carries critical importance to find the right clustering and orientations of LEDs to fulfill the required performance criteria. A hierarchical approach can be taken that takes key performance requirements as inputs, and then first returns optimized transmitter parameters followed by receiver parameters as outputs. It begins with determining room dimensions, led locations, desired illumination, user distribution, and mobility patterns to generate the SINR cumulative distribution functions 101. For example, the mobility pattern may assume that users may be uniformly distributed in the room, or they are statistically clustered in certain regions in the room. The 5% and median SINRs are then determined 102 to optimize transmitter (Tx) parameters 103 to calculate the LED Lambertian Order and LED transmitter tilt angles. The receiver (Rx) parameters can also be determined 104 and the receiver field of view (FOV) and photo detector (PD) title angles can then be calculated.

Deployment of base stations in hexagonal cells can provide the best capacity for cellular communications. With multi-element LED access points, if the total number of LEDs to be deployed in a room is specified, the question becomes how many access points will be deployed; in other words, how many LEDs are to be used in each access point. On one end of the spectrum, all LEDs can be clustered in a single access point, with different tilting angles. On the other end of the spectrum, each LED can be deployed as its own access point, following a hexagonal topology. With the framework of FIG. 30, the performance of different deployment architectures can be evaluated, and their key performance indicators can be captured. Subsequently, one of the deployment configurations can be selected over others, while also taking into account deployment cost factors. For example, using a single multi-element access point may yield suboptimal performance, but it may be less costly to deploy relative to deploying each LED as a single access point that requires installation of cables into each LED across the ceiling.

Figure 31:
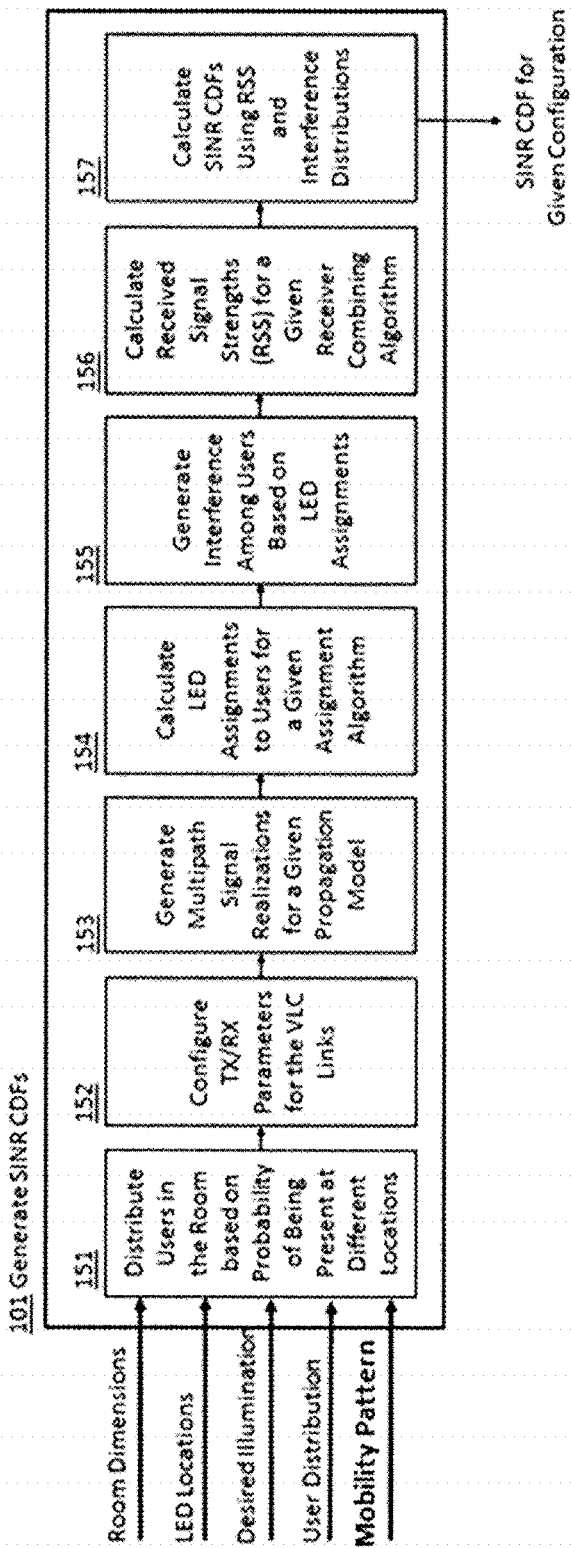
FIG. 31 is a diagram of a method for optimizing VLC according to the present invention.
Figure 32:
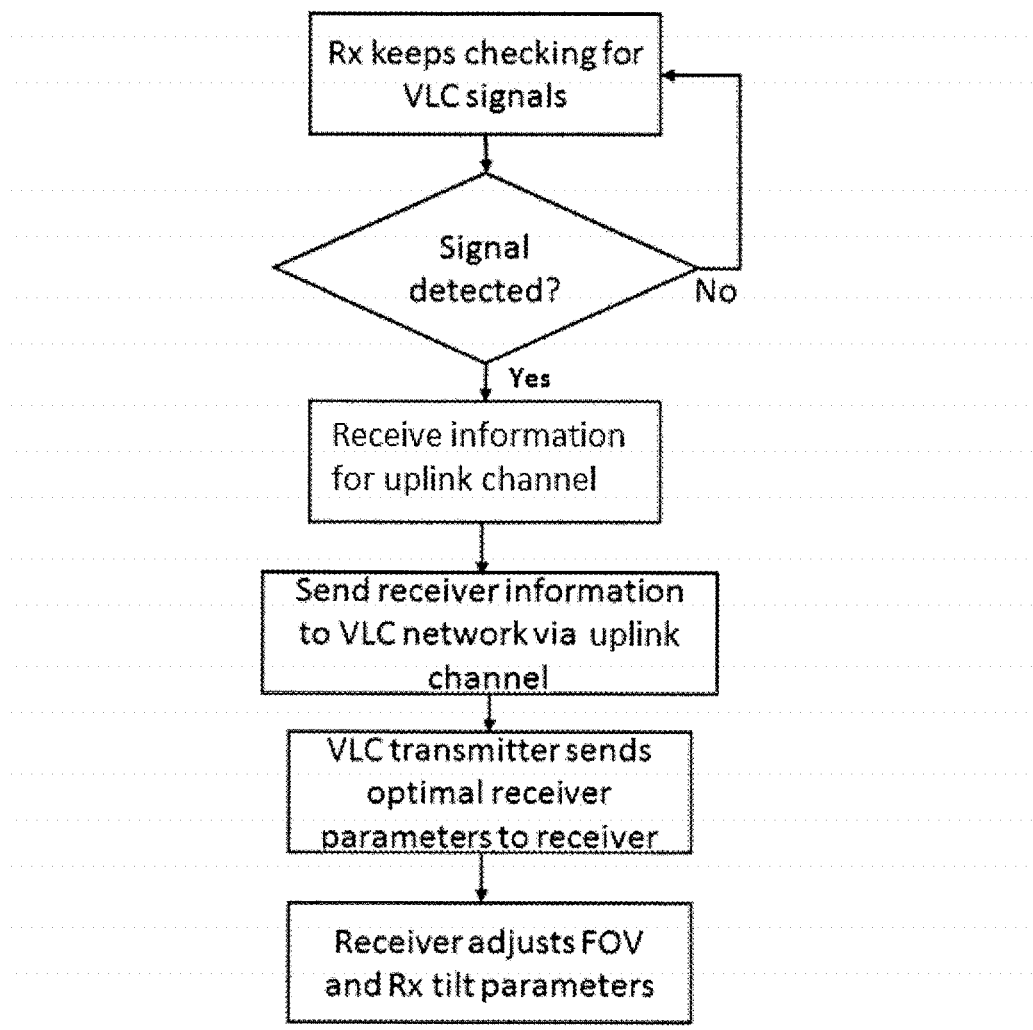
FIG. 32 is a method for adjusting receiver parameters according to the present invention.
Figure 33:
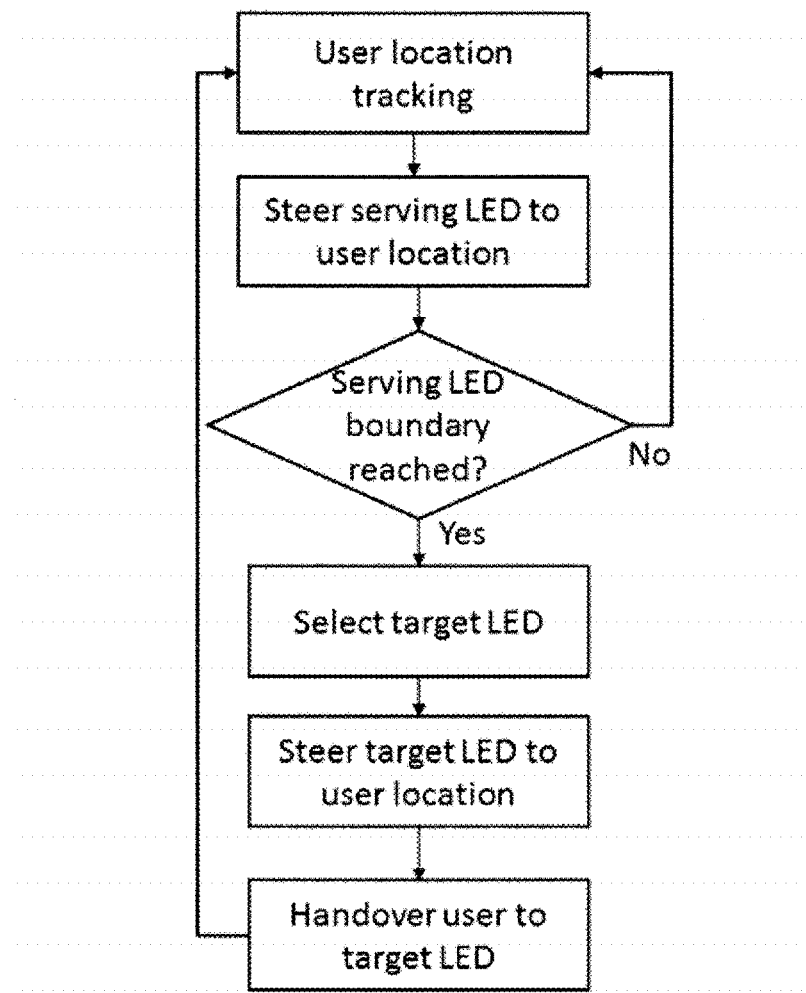
FIG. 33 is a method for beam steering according to the present invention.
Figure 34:
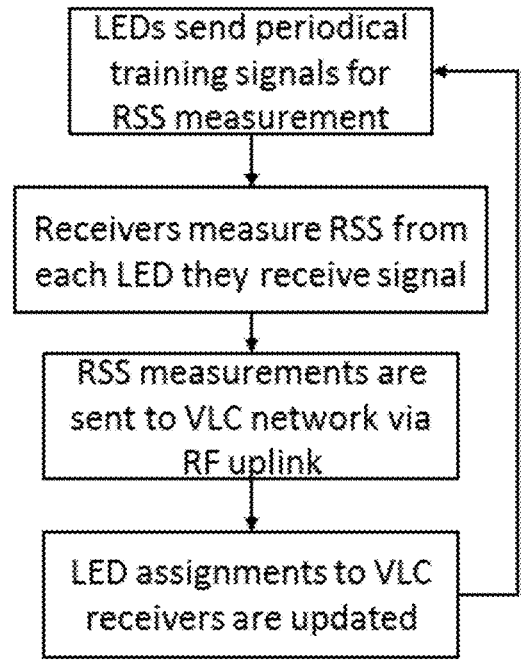
FIG. 34 is a diagram of a method for optimizing VLC according to the present invention.
Figure 35:
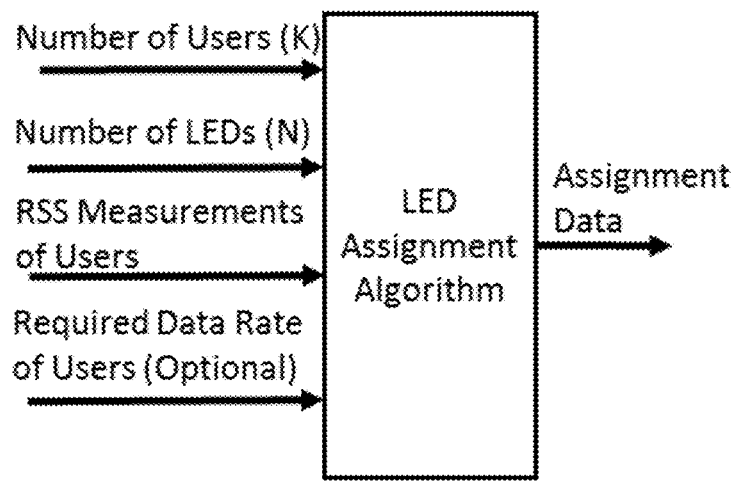
FIG. 35 is a diagram of LED deployment location and optimization according to the present invention.

FIG. 31 is a second diagram of a method for optimizing VLC according to the present invention. It begins with entering room dimensions, led locations, desired illumination, user distributions, and mobility patterns. The probability of users being in different locations is determined 151. Transmitters and receivers are then configured for the VLC links 152. Multipath signals are then generated for realizations for a given propagation model 154. Interference among users can then be calculated based on current LED assignments 155. Received signal strengths (RSS) for the given receiver combining algorithm can then be determined 156. The SINR CDFs can then be calculated using RSS and interference distributions 157 and the SINR CDF can be produced for the given configuration. This SINR CDF is representative of the system-level performance across a room, and will provide information about outage probability, worst user performance, and best user performance.

Figure 36:
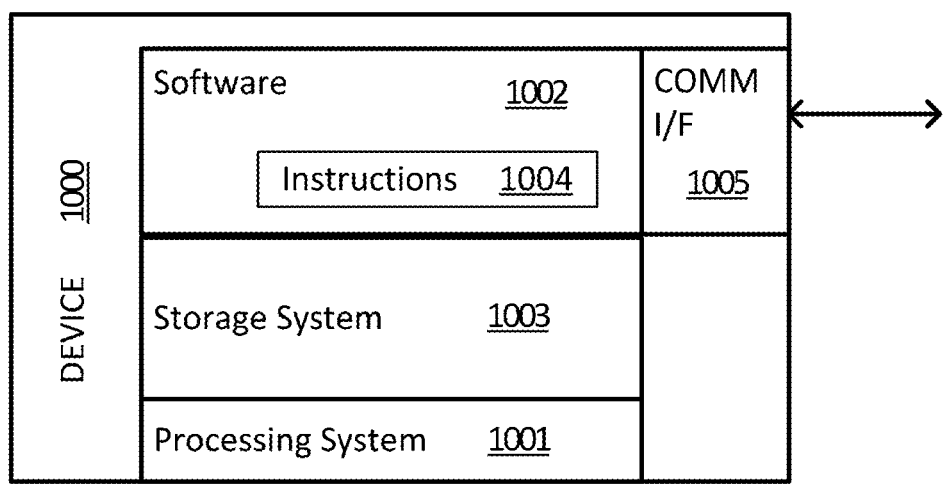
FIG. 36 is an example a device according to the present invention.

FIG. 36 shows a block diagram illustrating components of a computing device or system that can be used to implement the methods of the present invention. The device 1000 can itself include one or more computing devices. The hardware can be configured according to any suitable computer architectures such as Symmetric Multi-Processing (SMP) architecture or Non-Uniform Memory Access (NUMA) architecture.

The device 1000 can include a processing system 1001, which may include a processing device such as a central processing unit (CPU) or microprocessor and other circuitry that retrieves and executes software 1002 from storage system 1003. The processing system 1001 may be implemented within a single processing device but may also be distributed across multiple processing devices or sub-systems that cooperate in executing program instructions.

Examples of a processing system 1001 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

The storage system 1003 may comprise any computer readable storage media readable by processing system 1001 and capable of storing software 1002 including, e.g., processing instructions for determining VLC communication transmitter directionality. The storage system 1003 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, CDs, DVDs, flash memory, solid state memory, phase change memory, 3D-XPoint memory, or any other suitable storage media. Certain implementations may involve either or both virtual memory and non-virtual memory. In no case do storage media consist of a transitory, propagated signal. In addition to storage media, in some implementations, storage system 1003 may also include communication media over which software 1002 may be communicated internally or externally.

The storage system 1003 may be implemented as a single storage device but may also be implemented across multiple storage devices or sub-systems co-located or distributed relative to each other. The storage system 1003 may include additional elements capable of communicating with processing system 1001.

Software 1002 may be implemented in program instructions and, among other functions, may, when executed by device 1000 in general or processing system 1001 in particular, direct the device 1000 or processing system 1001 to execute the VLC communication methods described herein. Software 1002 may provide program instructions 1004 that implement the methods of the present invention. Software 1002 may implement on the device 1000 components, programs, agents, or layers that implement in machine-readable processing instructions 1004 the methods and techniques described herein.

In general, software 1002 may, when loaded into processing system 1001 and executed, transform the device 1000 overall from a general-purpose computing system into a special-purpose computing system customized to optimize VLC communication in accordance with the techniques herein. Indeed, encoding software 1002 on storage system 1003 may transform the physical structure of storage system 1003. The specific transformation of the physical structure may depend on various factors in different implementations of this description. Examples of such factors may include, but are not limited to, the technology used to implement the storage media of the storage system 1003 and whether the computer-storage media are characterized as primary or secondary storage.

Software 1002 may also include firmware or some other form of machine-readable processing instructions executable by processing system 1001. Software 1002 may also include additional processes, programs, or components, such as operating system software and other application software.

The device 1000 may represent any computing system on which software 1002 may be staged and from where software 1002 may be distributed, transported, downloaded, or otherwise provided to yet another computing system for deployment and execution, or yet additional distribution. The device 1000 may also represent other computing systems that may form a necessary or optional part of an operating environment for the disclosed techniques and systems.

A communication interface 1005 may be included, providing communication connections and devices that allow for communication between the device 1000 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of the device 1000 may be included in a system-on-a-chip (SoC) device. These elements may include, but are not limited to, the processing system 1001, a communications interface 1005, and even elements of the storage system 1003 and software 1002.

Alternatively, or in addition, the functionality, methods, and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1. A visible light communication (VLC) system, comprising:
one or more VLC transmitters (having one or multiple LED transmitters); and
a VLC receiver (e.g., with multiple photodetectors and implementing a diversity combining technique).

Embodiment 2. The system of Embodiment 1, wherein the diversity combining technique includes equal gain combining (EGC).

Embodiment 3. The system of Embodiments 1 to 2, wherein the diversity combining technique includes selective best combining (SBC).

Embodiment 4. The system of any of Embodiments 1 to 3, wherein the diversity combining technique includes maximal ratio combining (MRC).

Embodiment 5. The system of any of Embodiments 1 to 4, wherein the VLC transmitter is a multi-element diversity transmitter.

Embodiment 6. The system of any of Embodiments 1 to 5, wherein the VLC transmitter has three LEDs that are separated from each other with an azimuth angle of approximately 120 degrees.

Embodiment 7. The system of any of Embodiments 1 to 6, wherein the VLC transmitter has seven LEDs, one of which is oriented vertically downward and three that are directed horizontally at an azimuth angle of approximately 120 degrees between each of the three horizontally oriented LEDS.

Embodiment 8. The system of any of Embodiments 1 to 7, further comprising an SDR-based hybrid WiFi-LTE-VLC access point (AP) device with adaptive switching.

Embodiment 9. The system of any of Embodiments 1 to 8, wherein the VLC transmitters include a means for beam steering.

Embodiment 10. The system of any of Embodiments 1 to 9, wherein the means for beam steering includes piezoelectric actuators.

Embodiment 11. The system of any of Embodiments 1 to 10, wherein the VLC transmitters have a tilt angle from 25° to 45°.

Embodiment 12. The system of any of any of Embodiments 1 to 11, wherein the VLC transmitters have a tilt angle from 35° to 55°.

Embodiment 13. The system of any of Embodiments 1 to 12, wherein the VLC receivers include multiple PDs.

Embodiment 14. The system of any of Embodiments 1 to 13, wherein the PDs have a FOV of at least 28°.

Embodiment 15. The system of any of Embodiments 1 to 14, wherein the VLC receivers have three PDs with an FOVs from 16° to 25°.

Embodiment 16. The system of any of Embodiments 1 to 15, wherein the VLC receivers have seven PDs with an FOVs from 18° to 29°.

Embodiment 17. The system of any of Embodiments 1 to 16, wherein the system includes multiple single LED transmitter elements that are uniformly placed on a ceiling.

Embodiment 18. The system of any of Embodiments 1 to 17, further comprising LED transmitters that are clustered in multiple access points, and their performance loss with respect to a single LED transmitter scenario is compensated by diversity combining, beam steering, and multi-element LED assignment techniques.

Embodiment 19. The system of any of Embodiments 1 to 18, wherein the diversity combining technique includes optimal combining (OPC).

Embodiment 20. The system of any of Embodiments 1 to 19, wherein the VLC receiver is implemented within a personal user device (e.g., phone, tablet, personal computer, smartwatch, etc.).

Embodiment 21. The system of any of Embodiments 1 to 20, wherein multiple LEDs (2 or more) of one or more VLC transmitters serve a single user device.

Embodiment 22. The system of any of Embodiments 1 to 21, wherein each LED periodically transmits a training sequence.

Embodiment 23. The system of any of Embodiments 1 to 22, wherein users devices of the system periodically sends a channel quality indicator report back to the VLC transmitter (e.g., including position of the user devices and/or signal quality assessments).

Embodiment 24. The system of any of Embodiments 1 to 23, wherein the system maximizes total log-throughput.

Embodiment 25. The system of any of Embodiments 1 to 24, wherein the system determines LED assignment using a three-dimensional matching technique.

Embodiment 26. The system of any of Embodiments 1 to 25, wherein the system uses an initial assignment algorithm as a starting point for directing the VLC transmitter elements to the user devices (e.g., one or more of highest received signal strength (RSS) assignment, weighted signal power based assignment, and weighted signal strength (WSS) based assignment). As stated, the system can follow the initial assignment algorithm with a secondary heuristic algorithm (e.g., the greedy algorithm).

Embodiment 27. The system of any of Embodiments 1 to 26, wherein the system maximizes the sum rate of all users.

Embodiment 28. The system of any of Embodiments 1 to 27, wherein the system assigns LEDs based on a Greedy Algorithm or an equivalent (e.g., when user parameters change).

Embodiment 29. The system of any of Embodiments 1 to 28, wherein the Greedy Algorithm performs a number of iterations less than or equal to the total number of LEDs.

Embodiment 30. The system of any of Embodiments 1 to 29, wherein the system assigns LEDs based on a Proportional Rate Algorithm.

Embodiment 31. The system of any of Embodiments 1 to 30, wherein the system assigns LEDs based on a Weighted Signal Strength Algorithm.

Embodiment 32. The system of any of Embodiments 1 to 31, wherein if a required data rate for users is given, the system implements the Proportional Rate Algorithm.

Embodiment 33. The system of any of Embodiments 1 to 32, wherein if a required data rate for users is not given, the system implements the Weighted Signal Strength Algorithm.

Embodiment 34. The system of any of Embodiments 1 to 33, wherein the VLC transmitter and receiver deployment is designed in a coordinated way to improve the observed link quality at the users using multiple LED assignments to the users, LED steering at the transmitter, and diversity combining at the receiver.

Embodiment 35. The system of any of Embodiments 1 to 34, wherein the VLC transmitter LEDs are steered using a spatial light modulation technique.

Embodiment 36. The system of any of Embodiments 1 to 35, wherein one or more of the diversity combining algorithms are optimized using the LED assignment information and all the LEDs assigned to the same user act as a single LED source.

Embodiment 37. The system of any of Embodiments 1 to 36, wherein a single LED is assigned to multiple users (e.g., with a non-orthogonal multiple access (NOMA) technique).

Embodiment 38. The system of any of Embodiments 1 to 37, wherein the system incorporates any or all of the elements and/or techniques of Embodiments 201 to 208.

Embodiment 101. A method of visible light communication (VLC), the method comprising providing or implementing any of the elements or any combination of the elements of any or all of Embodiments 1 to 37.

Embodiment 201. A method of visible light communication (VLC), the method comprising:
determining room dimensions
determining a number of LEDs to be installed;
determining desired illumination;
determining user distribution;
determining mobility patterns; and
determining optimum LED locations.

Embodiment 202. The method of visible light communication (VLC) of Embodiment 201, further comprising generating signal to noise ratio (SINR) cumulative distribution functions (CDFs).

Embodiment 203. The method of visible light communication (VLC) of any of Embodiments 201 to 202, further comprising extracting 5% and median SINRs.

Embodiment 204. The method of visible light communication (VLC) of any of Embodiments 201 to 203, further comprising optimizing transmitter (Tx) parameters to obtain an LED Lambertian Order (n) and/or LED tilt angle.

Embodiment 205. The method of visible light communication (VLC) of any of Embodiments 201 to 204, further comprising optimizing receiver (Rx) parameters to obtain receiver field of view (FOV) and receiver (Rx) photodetector tilt angles.

Embodiment 206. The method of visible light communication (VLC) of any of Embodiments 201 to 205, further comprising adjusting receiver parameters by detecting VLC signals, receiving information for an uplink channel, sending receiver information to the VLC network via the uplink channel, transmitting optimal receiver parameters to the receiver, and adjusting receiver FOV and tilt parameters.

Embodiment 207. The method of visible light communication (VLC) of any of Embodiments 201 to 206, further comprising a beam steering method including:
tracking user location;
steering a serving LED to the user location;
determining when the serving LED reaches a boundary line;
selecting a target LED (the LED that the user device will be transferred to so that optimum data transmission can continue);
steering the target LED to the user location; and
handing over the user to the target LED.

Embodiment 208. The method of visible light communication (VLC) of any of Embodiments 201 to 207, further comprising:
sending periodical training signals for received signal strength (RSS) measurement;
measuring RSS from each LED;
sending RSS measurements to VLC network via a radio frequency (RF) uplink; and
updating LED assignments to LED receivers.

Embodiment 209. The method of visible light communication (VLC) of any of
Embodiments 201 to 208, further comprising providing or implementing any of the elements or any combination of the elements of Embodiments 1 to 38.

A greater understanding of the present invention and of its many advantages may be had from the following example, given by way of illustration. The following example is illustrative of some of the methods, applications, embodiments, and variants of the present invention. They are, of course, not to be considered as limiting the invention. Numerous changes and modifications can be made with respect to the invention.

Example 1

Simulations were conducted to prove the concepts and techniques of the present invention. In this example, the performance of initial assignment and greedy algorithms was evaluated. The simulations assumed that the LEDs had a Lambertian pattern. A large room with the dimensions of 19 m×10 m×4 m was the basis for the simulation. The layout of LEDs and APs for this example is shown in FIG. 17. Six APs were considered, each having 7 LEDs. In total, there were 42 LEDs to be shared by the users. Each AP was structured such that one LED was directed towards the floor, and the rest were tilted with a 45° divergence angle. All APs were located at ceiling height, and the receiver was assumed to be at 0.85 m in height and directed upwards. Multiple realizations were performed by dropping the receiver at random locations.

Figure 18:
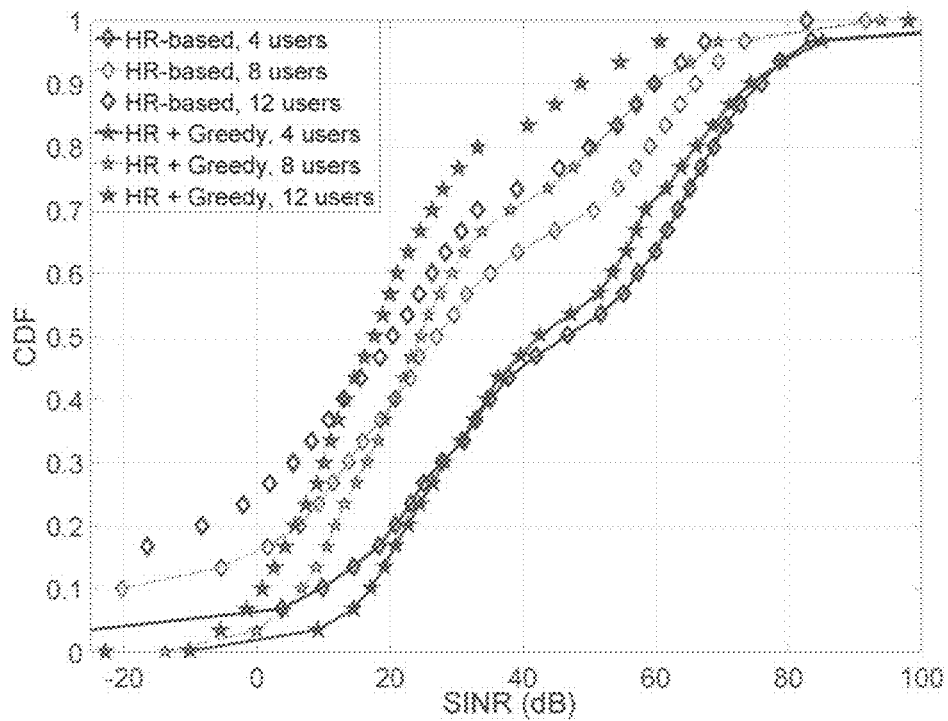
FIG. 18 is a graph of CDF of SINR for HR-based assignment evaluated for 4, 8 and 12 user scenarios.
Figure 19:
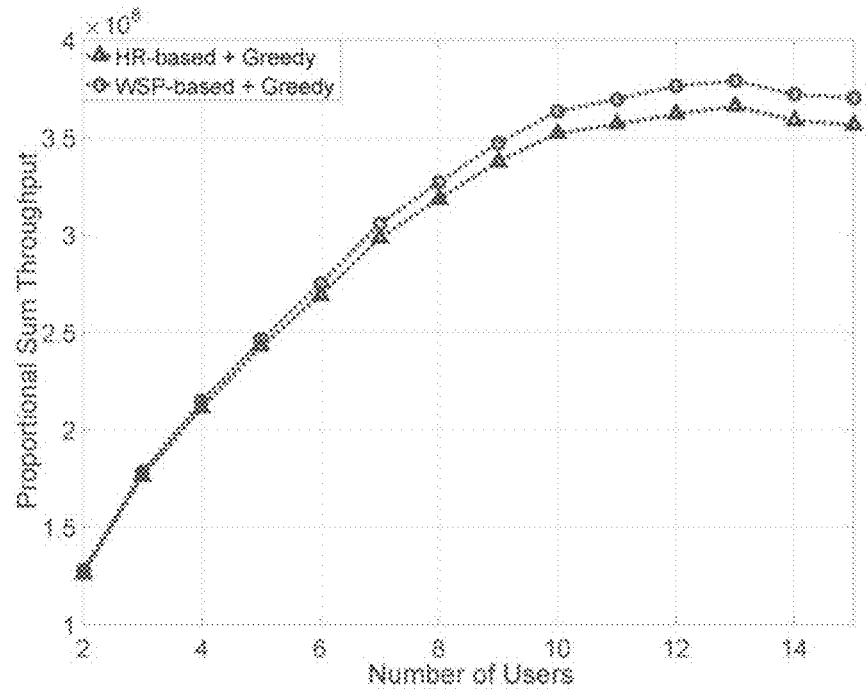
FIG. 19 is a graph of proportionally fair sum throughput (logarithmic sum throughput), averaged over a large number of iterations with randomly chosen user locations.

In FIG. 18 and FIG. 19, the CDFs of SINRs for HR-based and WSP-based methods are shown, respectively. The CDFs were evaluated based on 60 different realizations, and the SINR of all users was included. Examples with 4, 8, and 12 users are illustrated. In FIG. 8, the CDF of SINR for the HR-based method is shown. When the number of users increases, the average SINR available to each user decreases as the LED resources are shared. Note that while the greedy algorithm decreases the overall SINR, it increases the SINR of users with low SINR. Moreover, the curves generated based on the greedy algorithm intersect with the x-axis, while the other curves do not. Therefore, without the greedy algorithm, there will be users that do not have an assigned LED. In this case, evaluating logarithmic throughput is not possible, since if any of the users have zero throughput, their logarithmic throughput is negative infinity.

Figure 20:
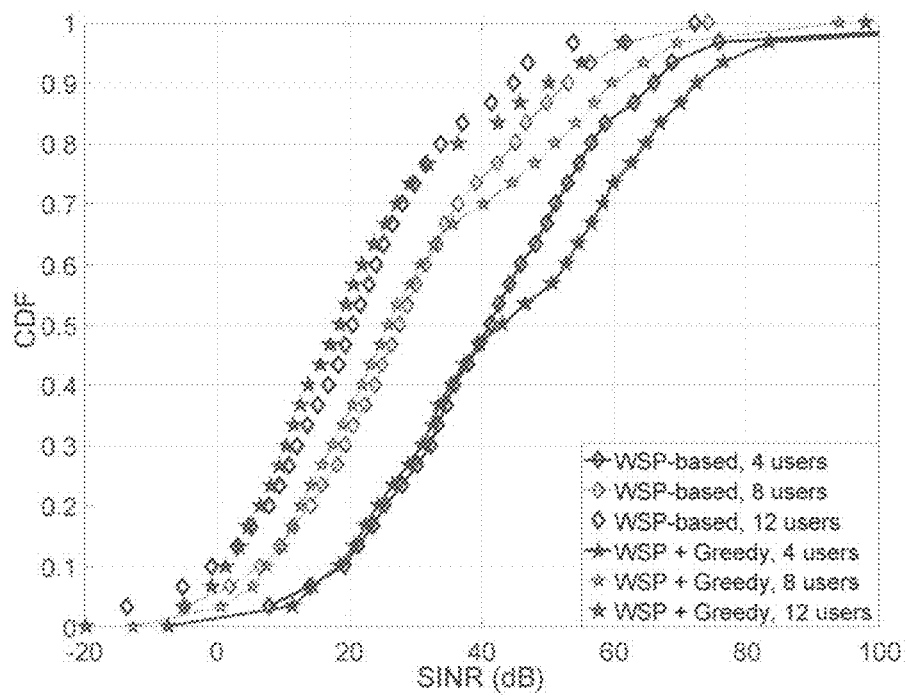
FIG. 20 is a graph of CDF of SINR for WSP-based assignment, evaluated for 4, 8 and 12 user scenarios.

In FIG. 20, the CDF of SINR for a WSP-based method is given. In this case, the greedy algorithm improves the SINR of both users with good SINR and users with SINR under 10%. Moreover, the curves without the greedy algorithm do not intersect the x-axis, which indicates that there are users that have 0 dB SINR. For both methods, using the greedy algorithm ensures that all users will be served. In addition, it is impossible to evaluate the logarithmic throughput of both methods without the greedy algorithm because the result will be negative infinity.

Figure 21:
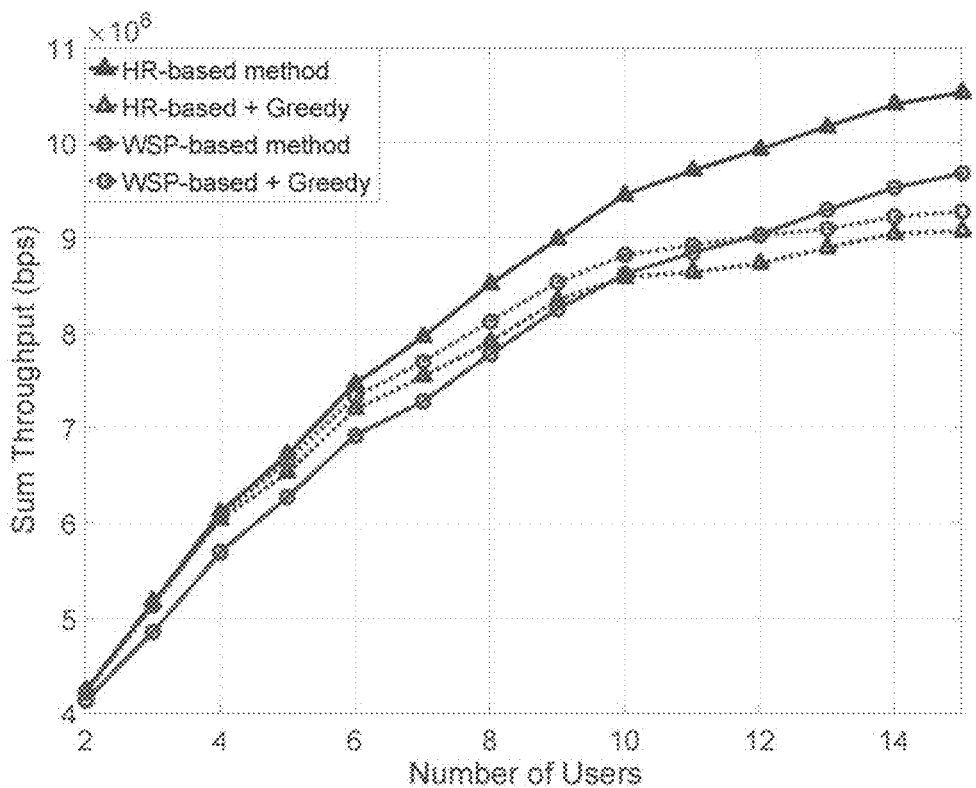
FIG. 21 is a graph of sum throughput for various methods of the present invention, averaged over a large number of iterations with randomly chosen user locations.

The following analysis was based on the average of 100 different realizations. In FIG. 19, the logarithmic throughput of both methods is shown. Without the greedy algorithm, both algorithms cannot yield a proportionally fair assignment. Therefore, only the results with the greedy algorithm are illustrated. The WSP-based method performs better in terms of proportional fairness, and the performance difference between the two methods increases when the number of users increases. Logarithmic throughput is maximized with 13 users for both methods. FIG. 21 shows the aggregate throughput for both methods. HR-based assignment gives the best sum throughput. As this method assigns each LED to the user with the highest received signal, and does not consider fairness criterion, it is expected to yield the highest sum throughput. The WSP-based assignment yields lower throughput. On the other hand, the greedy algorithm decreases the sum throughput of the HR-based assignment. However, it significantly improves the sum throughput of weighted signal power based methods when the number of users is between 2 and 12.

Figure 22:
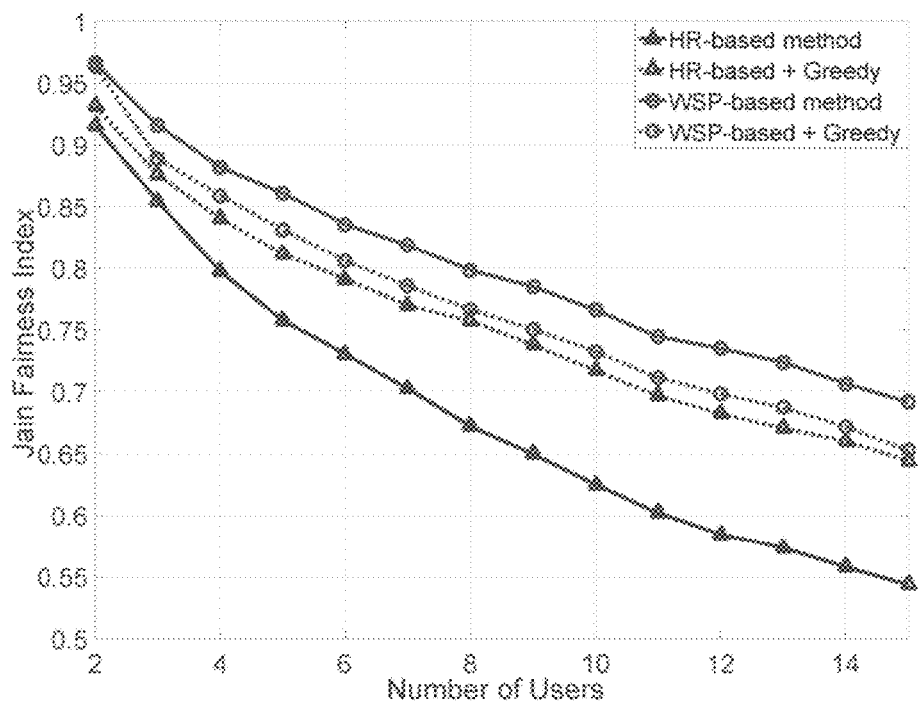
FIG. 22 is a graph of Jain's fairness indices.

Finally, in FIG. 22, the Jain's fairness index for different methods is provided. The WSP-based assignment has the highest fairness index. The greedy algorithm decreases the Jain's fairness index of the WSP-based assignment. However, it increases the fairness index of the HR-based assignment significantly.

Example 2

Figures 24A, 24B:
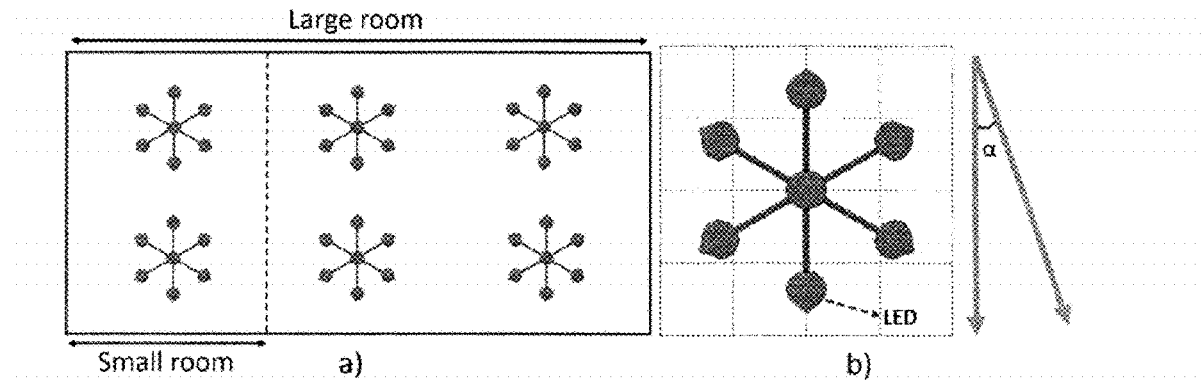
FIG. 24(a) is a sample layout of APs.
FIG. 24(b) is a diagram illustrating an AP from a top view and the divergence angle of side LEDs relative to a central LED.

A second set of simulations using the techniques of the present invention was conducted, including the consideration of multipath reflections. In a first simulation, a large room with dimensions of 19.5 m×10 m×4 m was considered. The layout of LEDs and APs in the room was as shown by the "large room" in FIG. 24(a). Six APs were considered, each having 7 LEDs. In total, there were 42 LEDs to be shared by the users. The second setup was smaller and was designed to compare the performance of the algorithms to the optimal solution. Since the optimal solution is prohibitively complex to find for a large number of LEDs, a smaller room with fewer LEDs was used. The "small room" had dimensions of 6.5 m×10 m×4 m with 6 APs, each having 7 LEDs, as shown in FIG. 24(a). Each AP was structured such that one LED was directed towards the floor, and the rest were tilted with a 45° divergence angle as in FIG. 24(b). All APs were located at ceiling height, and the receiver was assumed to be at 0.85 m in height and directed upwards. The simulation considered up to four wall reflections. Multiple realizations were performed by dropping the receivers at random locations. The average results of the realizations are provided and the simulation patterns can be seen in Table II.

TABLE II

| SIMULATION PARAMETERS. | |
|---|---|
| LED directivity index, i | 7.0459 |
| Transmission power of an LED, $p_n$ | 2 W |
| Modulation bandwidth, B | 20 MHz |
| AWGN spectral density, $N_O$ | $2.5 \times 10^{-20}$ A/Hz |
| Effective surface area of PDs, $A_R$ | 40 mm$^2$ |
| Reflection coefficient (walls) | 0.8 |
| Reflection coefficient (floor, ceiling) | 0.3 |

Figure 27:
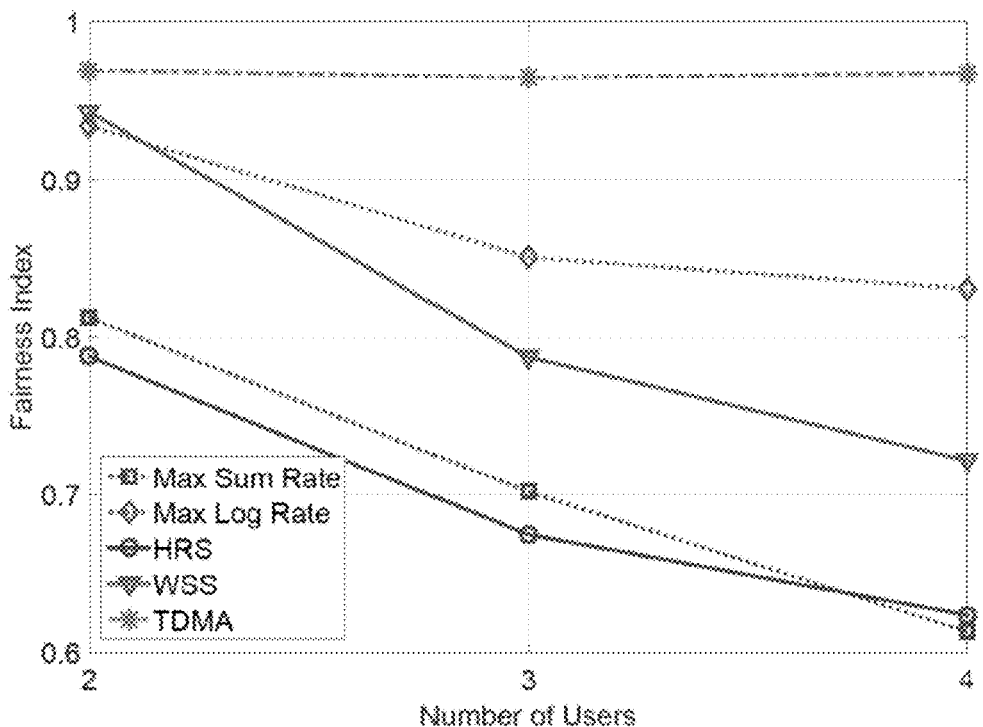
FIG. 27 is a graph of fairness indices for different assignment schemes for different numbers of users.

A Jain's fairness index of the results can be seen in FIG. 27. The Jain's fairness index takes values between 1/K and 1, with K being the number of users and a higher index meaning a fairer distribution.

Figure 25:
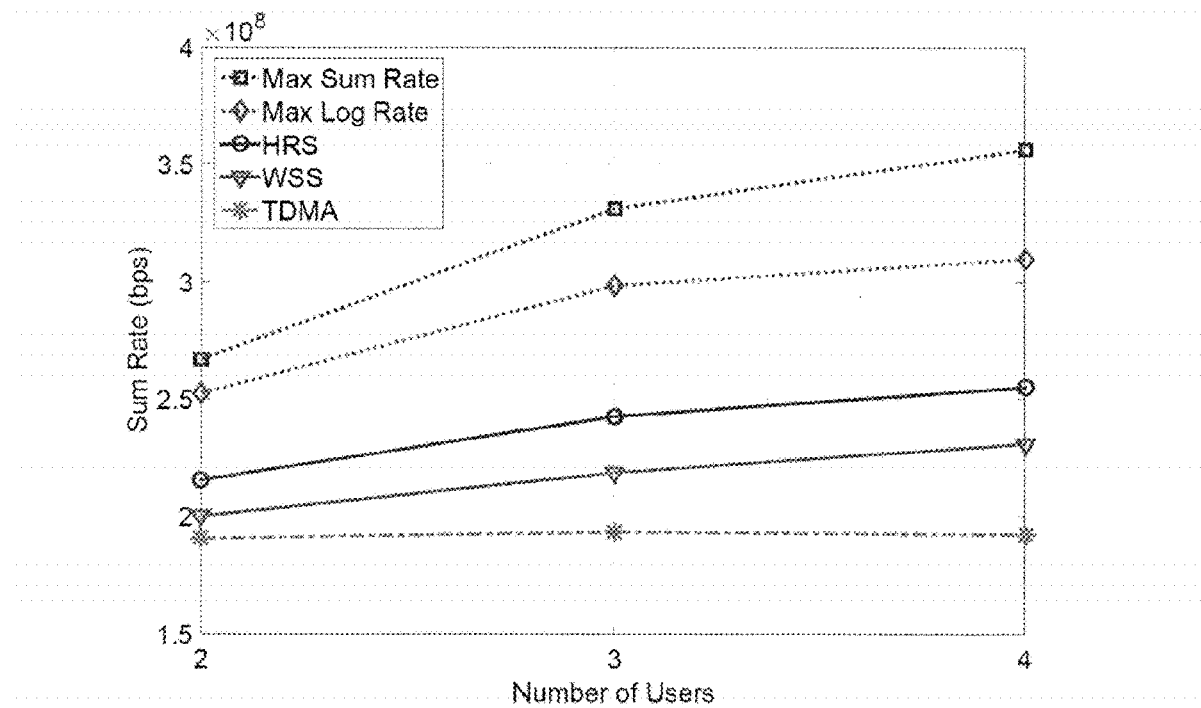
FIG. 25 is a graph of the sum data transfer rate for various numbers of users.

In FIG. 25, the sum rates are given for the optimal LED assignments, the proposed HRS and WSS assignments, and time-division-multiple-access (TDMA). FIG. 27 shows the fairness indexes for the same assignment schemes. The optimal assignments were found by exhaustive search of all possible LED assignments. These assignments are given the labels "maximum sum rate" and "maximum log rate," which maximizes the sum rate of the users and the sum of the logarithmic rate of the users, respectively. With TDMA, all LEDs send the same signal and allocate by time division amongst the users. The small room setup is considered with up to 4 users. It was not possible to find optimal solutions for more than 4 users due to computation complexity and hardware restrictions. The proposed HRS algorithm shows a similar fairness index to the maximum sum rate assignment, and it also provides around 75% of the maximum rate. WSS is comparable to maximum logarithmic throughput assignment since they both prioritize proportional fairness criteria. While WSS shows a similar fairness index to maximum logarithmic throughput assignment for two users, for three and four users it shows a lower fairness index. That is, it provides around 70%-80% of the rate of maximal logarithmic sum assignment in general. WSS and HRS provide a higher sum rate than TDMA, and the gain over TDMA increases with an increasing number of users.

Figure 26:
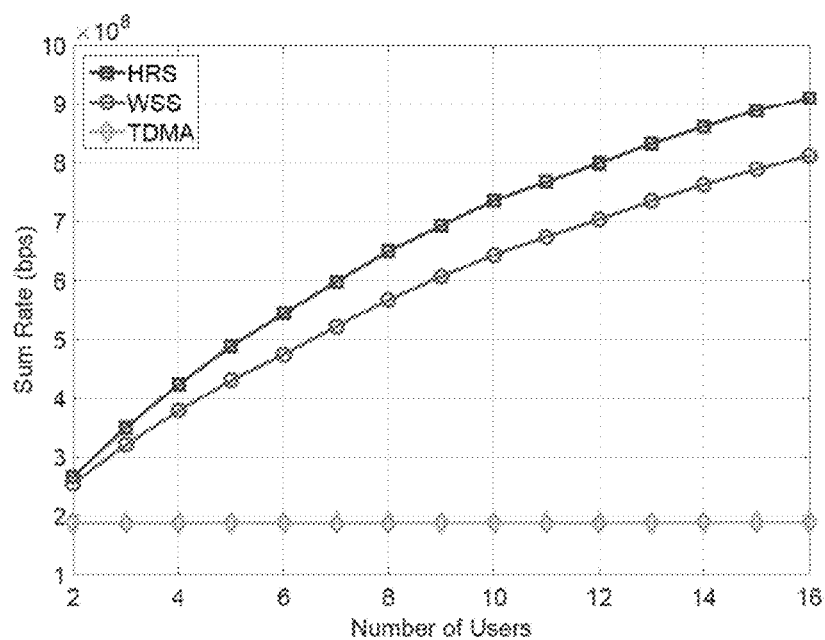
FIG. 26 is a graph of the sum rates for HRS, WSS, and TDMA algorithms for different numbers of users.
Figure 28:
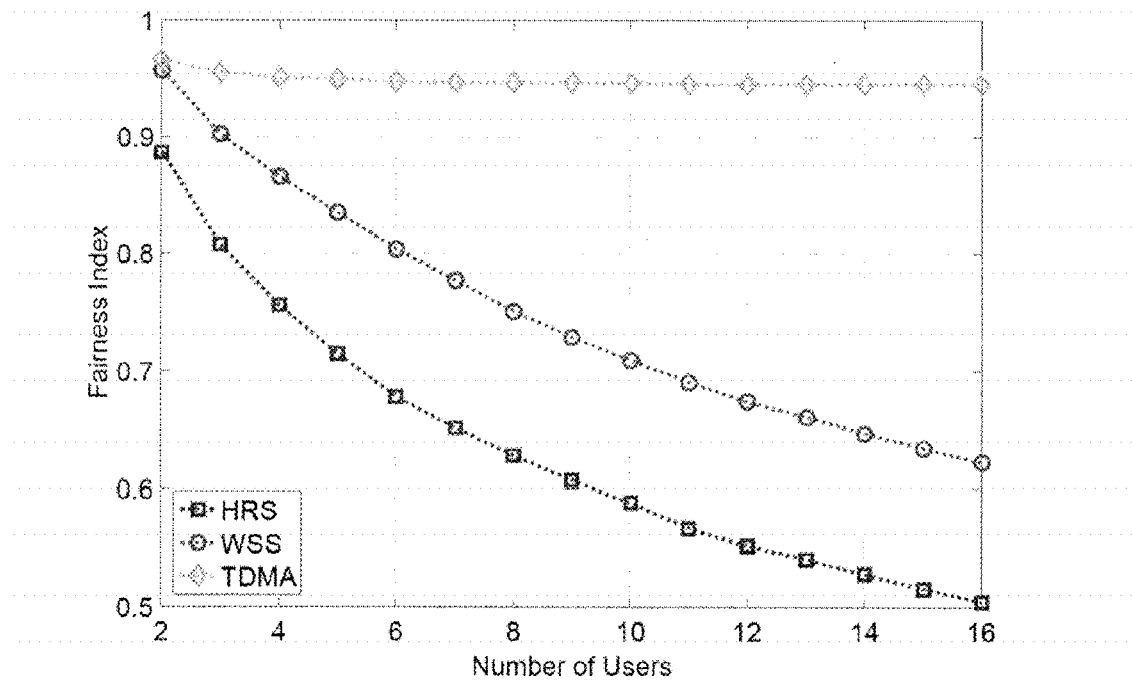
FIG. 28 is a graph of fairness indices for HRS, WSS, and TDMA algorithms for different numbers of users.
Figure 29:
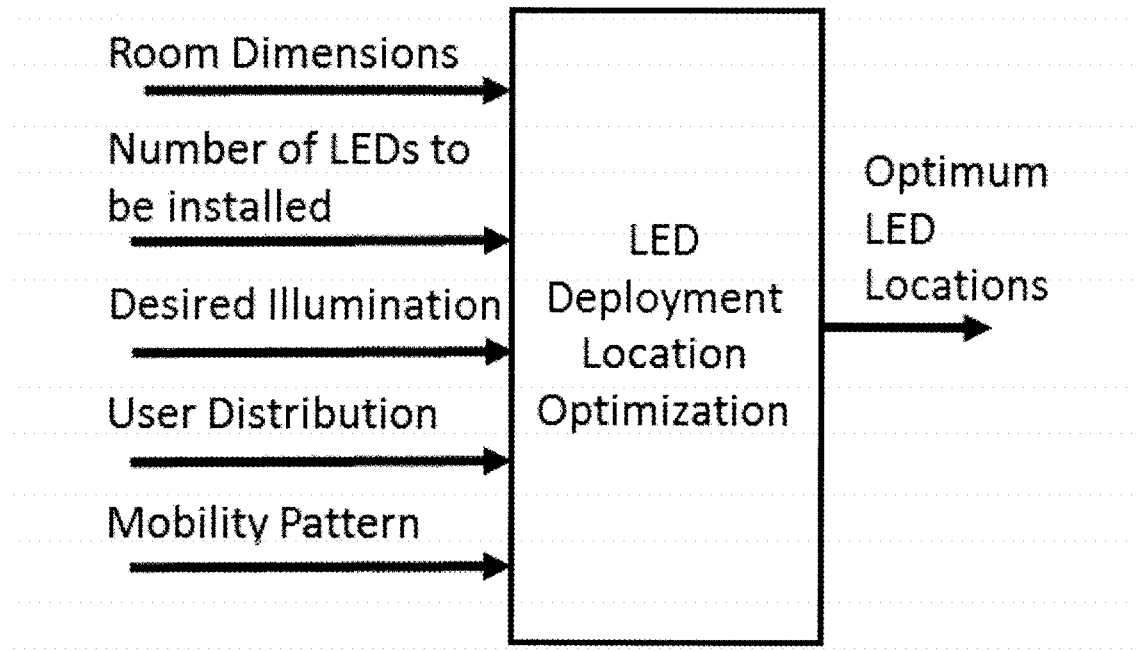
FIG. 29 is a diagram of a method for LED deployment location and optimization according to the present invention.

In FIG. 26, the sum rate for HRS and WSS based algorithms is shown. The larger room setup in FIG. 24(a) is used in these simulations. The results with TDMA are also shown for reference. While HRS shows the highest sum rate performance, WSS has only a slightly lower rate. As HRS assigns each LED to the user with the highest received signal, and does not consider any fairness criterion, it is expected to yield the highest sum throughput. Both algorithms constantly increase the sum rate when the number of users increases by making use of spatial diversity. When there are 10 users, the proposed algorithms provide more than four times gain over TDMA. When there are 16 users, the gain is more than six times. In FIG. 28, the fairness index for the same algorithms is given. The WSS provides a significantly higher fairness index in comparison to HRS, since it considers the entire received signal power by a user and provides a more fair LED assignment.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

A. Gomez et al., "Beyond 100-Gb/s Indoor Wide Field-of-View Optical Wireless Communications," in IEEE Photonics Technology Letters, vol. 27, no. 4, pp. 367-370, Feb. 15, 15 2015. doi: 10.1109/LPT.2014.2374995.

S. Rajbhandari et al., "High-Speed Integrated Visible Light Communication System: Device Constraints and Design Considerations," in IEEE Journal on Selected Areas in Communications, vol. 33, no. 9, pp. 1750-1757, September 2015. doi: 10.1109/JSAC.2015.2432551.

2016 Global LED Lighting Market Trends Report by LEDinside, U.S. Energy Information Administration, Annual Energy Outlook 2014 Early Release; M. Bilgi, A. Sevincer, M. Yuksel, N. Pala, "Optical wireless localization", Wireless Networks Vol. 18, pp. 215-226 (2012).

M. Yuksel, A. Jayasri, S. Kalyanaraman, and P. Dutta, "Free-space-optical mobile ad hoc networks: Auto-configurable building blocks", Wireless Networks, vol. 15 m no. 3, pp.295-312, 2009.

Y. S. Eroglu, A. Sahin, I. Guvenc, N. Pala, and M. Yuksel, "Multi-Element Transmitter Design and Performance Evaluation for Visible Light Communication", in Proc. IEEE Int. Workshop on Optical Wireless Communications (co-located with IEEE GLOBECOM), San Diego, Calif., December 2015.

P. Palathingal, M. Yuksel, I. Guvenc, and N. Pala, "A Multi-Element VLC Architecture for High Spatial Reuse", in Proc. ACM Workshop on Visible Light Communication Systems (Co-Located with ACM MOBICOM), Paris, France, September 2015.

Y. S. Eroglu, I. Guvenc, A. Sahin, N. Pala, and M. Yuksel, "Diversity Combining and Beam Steering for Multi-Element Visible Light Communications", submitted to IEEE Global Telecommun. Conf. (GLOBECOM), Washington, D.C., December 2016.

A. Sahin, Y. S. Eroglu, I. Guvenc, N. Pala, and M. Yuksel, "Hybrid 3D Localization for Visible Light Communication Systems", IEEE/OSA Journal of Lightwave Technology, vol. 33, no. 22, pp. 4589-4599, September 2015.

A. Sahin, Y. S. Eroglu, I. Guvenc, N. Pala, M. Yuksel, "Accuracy of AOA-Based and RSS-Based 3D Localization for Visible Light Communications", in Proc. IEEE Vehic. Technol. Conf. (VTC), Boston, Mass., September 2015.

Y. S. Eroglu, I. Guvenc, N. Pala, and M. Yuksel, "AOA-Based Localization and Tracking in Multi-Element VLC Systems", in Proc. IEEE Wireless and Microwave Conference (WAMICON), Cocoa Beach, Fla., April 2015.

U.S. Pat. No. 7,548,698B2, "Light communication system and illumination apparatus therefor", United States Patent, 2009.

US20100067916A1, "System for visible light communication using single light source", United States Patent,2010.

US20150326314A1, "Tandem, Visible Light and RF Communication System", United States Patent, 2015.

US20080320200A1, "Led light dongle communication system", United States Patent, 2008.

US20060214815A1, "Mobile communication network system, portable communication terminal, and authentication device, and driving method", United States Patent, 2006.

US20110135317A1, "Controlling brightness of light sources used for data transmission", United States Patent, 2011.

US20110069962A1, "Method and apparatus for dimming with rate control for visible light communications (VLC) ", United States Patent, 2011.

C. Gong and Z. Xu, "Linear receivers for optical wireless scattering communication with multiple photon detectors," in Proc. IEEE Global Telecommun. Conf. (GLOBECOM) Workshops, Austin, Tex., December 2014.

A. Nuwanpriya, S.-W. Ho, and C. S. Chen, "Agle diversity receiver for indoor MIMO visible light communications," in Proc. IEEE Global Telecommun. Conf. (GLOBECOM) Workshops, Austin, Tex., December 2014.

A. Tsiatmas, F. Willems, and S. Baggen, "Optimum diversity combining techniques for visible light communication systems," in Proc. IEEE Global Telecommun. Conf. (GLOBECOM) Workshops, Austin, Tex., December 2014.

Z. Chen, D. Tsonev, and H. Haas, "Improving SINR in indoor cellular visible light communication networks," in Proc. IEEE Int. Conf. Commun. (ICC), Sydney, Australia, June 2014, pp. 3383-3388.

F. Claeyssen, R. Le Letty, F. Barillot, N. Lhermet, and H. Fabbro, "Mechanisms based on piezoactuators," in Proc. SPIE, vol. 4332, 2001.

US7548698B2, Light communication system and illumination apparatus therefor, 2009.

US20100067916A1, System for visible light communication using single light source, 2010.

US20150326314A1, Tandem, Visible Light and RF Communication System, 2015.

US20080320200A1, Led light dongle communication system, 2008.

US20060214815A1, Mobile communication network system, portable communication terminal, and authentication device, and driving method, 2006.

US20110135317A1, Controlling brightness of light sources used for data transmission, 2011.

US20110069962A1, Method and apparatus for dimming with rate control for visible light communications (vlc), 2011.

T. Q. S. Quek, G. de la Roche, I. Guvenc, and M. Kountouris, Small Cell Networks. Cambridge University Press, 2013.

A. Mostafa and L. Lampe, "Physical-layer security for indoor visible light communications," in Proc. IEEE Int. Conf. Commun. (ICC), Sydney, Australia, June 2014.

M. Kavehrad, "Sustainable energy-efficient wireless applications using light," IEEE Commun. Mag., vol. 48, pp. 66–73, December 2010.

Y. S. Eroglu, I. Guvenc, N. Pala, and M. Yuksel, "AOA-based localization and tracking in multi-element VLC systems," in Proc. IEEE Wireless and Microwave Tech. Conf. (WAMICON), Cocoa Beach, Fla., April 2015.

A. Sahin, Y. S. Eroglu, I. Guvenc, N. Pala, and M. Yuksel, "Hybrid 3-D localization for visible light communication systems," IEEE J. Lightwave Technol., vol. 33, no. 22, pp. 4589-4599, November 2015.

M. F. Keskin and S. Gezici, "Comparative theoretical analysis of distance estimation in visible light positioning systems," IEEE J. Lightwave Technol., vol. 34, no. 3, pp. 854–865, February 2016.

Y. S. Eroglu, A. Sahin, I. Guvenc, N. Pala, and M. Yuksel, "Multielement transmitter design and performance evaluation for visible light communication," in Proc. IEEE Global Telecommun. Conf. (GLOBECOM) Workshops, San Diego, Calif., December 2015.

L. Yin, X. Wu, and H. Haas, "Indoor visible light positioning with angle diversity transmitter," in Proc. IEEE Vehic. Technol. Conf. (VTC), Boston, Mass., September 2015.

C. Gong and Z. Xu, "Linear receivers for optical wireless scattering communication with multiple photon detectors," in Proc. IEEE Global Telecommun. Conf. (GLOBECOM) Workshops, Austin, Tex., December 2014.

A. Nuwanpriya, S.-W. Ho, and C. S. Chen, "Angle diversity receiver for indoor MIMO visible light communications," in Proc. IEEE Global Telecommun. Conf. (GLOBECOM) Workshops, Austin, Tex., December 2014.

A. Tsiatmas, F. Willems, and S. Baggen, "Optimum diversity combining techniques for visible light communication systems," in Proc. IEEE GLOBECOM Workshops, Austin, Tex., December 2014.

Z. Chen, D. Tsonev, and H. Haas, "Improving SINR in indoor cellular visible light communication networks," in Proc. IEEE Int. Conf. Commun. (ICC), Sydney, Australia, June 2014, pp. 3383–3388.

F. Claeyssen, R. Le Letty, F. Barillot, N. Lhermet, and H. Fabbro, "Mechanisms based on piezoactuators," in Proc. SPIE, vol. 4332, 2001.

J. Barry, J. Kahn, W. Krause, E. Lee, and D. Messerschmitt, "Simulation of multipath impulse response for indoor wireless optical channels," IEEE J. Select. Areas Commun. (JSAC), vol. 11, no. 3, pp. 367–379, April 1993.

Y. S. Eroglu, A. Sahin, I. Guvenc, N. Pala, and M. Yuksel, "Multi-element transmitter design and performance evaluation for visible light communication," in Proc. IEEE Global Telecommun. Conf. (GLOBECOM) Workshops, San Diego, Calif., December 2015.

L. Yin, X. Wu, and H. Haas, "Indoor visible light positioning with angle diversity transmitter," in Proc. IEEE Vehic. Technol. Conf. (VTC), Boston, Mass., September 2015.

A. Sahin, Y. S. Eroglu, I. Guvenc, N. Pala, and M. Yuksel, "Hybrid 3-D localization for visible light communication systems," IEEE J. Lightwave Technol., vol. 33, no. 22, pp. 4589-4599, November 2015.

Y. S. Eroglu, A. Sahin, I. Guvenc, A. Sahin, N. Pala, and M. Yuksel, "Impact of LED Assignment on Throughput and Fairness in Multi-User VLC Networks," in Proc. IEEE Department of Computer Science and Engineering, University of Nevada, Reno, Nev.

A. Sahin, Y. S. Eroglu, I. Guvenc, N. Pala, and M. Yuksel, "Hybrid 3-D localization for visible light communication systems," IEEE J. Lightwave Technol., vol. 33, no. 22, pp. 4589-4599, November 2015.

L. Yin, X. Wu, and H. Haas, "Indoor visible light positioning with angle diversity transmitter," in Proc. IEEE Vehic. Technol. Conf. (VTC), Boston, Mass., September 2015.

Y. S. Eroglu, A. Sahin, I. Guvenc, N. Pala, and M. Yuksel, "Multielement transmitter design and performance evaluation for visible light communication," in Proc. IEEE Global Telecommun. Conf. (GLOBECOM) Workshops, San Diego, Calif., December 2015.

T. Bu, L. Li, and R. Ramjee, "Generalized proportional fair scheduling in third generation wireless data networks," in Proc. IEEE INFOCOM Int. Conf. on Computer Commun., April 2006, pp. 1-12.

H. Kim, K. Kim, Y. Han, and S. Yun, "A proportional fair scheduling for multicarrier transmission systems," in Vehicular Technology Conference, vol. 1, September 2004.

D. Lee, H. Seo, B. Clerckx, E. Hardouin, D. Mazzarese, S. Nagata, and K. Sayana, "Coordinated multipoint transmission and reception in LTE-Advanced: deployment scenarios and operational challenges," IEEE Communications Magazine, vol. 50, no. 2, pp. 148-155, February 2012.

S. Sun, Q. Gao, Y. Peng, Y. Wang, and L. Song, "Interference management through comp in 3GPP LTE-Advanced networks," IEEE Wireless Communications, vol. 20, no. 1, pp. 59-66, February 2013.

C. Chen, D. Tsonev, and H. Haas, "Joint transmission in indoor visible light communication downlink cellular networks," in 2013 IEEE Globecom Workshops, December 2013, pp. 1127-1132.

H. Ma, L. Lampe, and S. Hranilovic, "Coordinated broadcasting for multiuser indoor visible light communication systems," IEEE Transactions on Communications, vol. 63, no. 9, pp. 3313-3324, September 2015.

F. Kelly, A. K. Maulloo, and D. Tan, "Rate control for communication networks: Shadow prices, proportional fairness and stability," The Journal of the Operational Research Society, vol. 49, no. 3, pp. 237-252, 1998.

M. Andrews, L. Qian, and A. Stolyar, "Optimal utility based multi-user throughput allocation subject to throughput constraints," in Proc. IEEE 24th Annual Joint Conf. of the IEEE Computer and Commun. Societies., vol. 4, March 2005, pp. 2415-2424 vol. 4.

G. J. Woeginger, Exact Algorithms for NP-Hard Problems: A Survey, M. Junger, G. Reinelt, and G. Rinaldi, Eds. Berlin, Heidelberg: Springer Berlin Heidelberg, 2003.

A. Frieze, "Complexity of a 3-dimensional assignment problem," European Journal of Operational Research, vol. 13, no. 2, pp. 161-164, 1983. [14] J. Barry, J. Kahn, W. Krause, E. Lee, and D. Messerschmitt, "Simulation of multipath impulse response for indoor wireless optical channels," IEEE J. Select. Areas Commun. (JSAC), vol. 11, no. 3, pp. 367-379, April 1993.

P. Palathingal, I. Guvenc, N. Pala, and M. Yuksel, "A multi-element VLC architecture for high spatial reuse," in Proc. ACM Workshop on Visible Light Communication Systems, October 2015.

T. Bu, L. Li, and R. Ramjee, "Generalized proportional fair scheduling in third generation wireless data networks," in Proc. IEEE INFOCOM Int. Conf. on Computer Commun., April 2006, pp. 1-12.

H. Kim, K. Kim, Y. Han, and S. Yun, "A proportional fair scheduling for multicarrier transmission systems," in Proc. IEEE Vehic. Technol. Conf. (VTC), Los Angeles, Calif., September 2004.

A. Sahin, Y. S. Eroglu, I. Guvenc, N. Pala, and M. Yüksel, "Hybrid 3-D localization for visible light communication systems," *IEEE J. Lightwave Technol.*, vol. 33, no. 22, pp. 4589-4599, November 2015.

L. Yin, X. Wu, and H. Haas, "Indoor visible light positioning with angle diversity transmitter," in *Proc. IEEE Vehic. Technol. Conf. (VTC)*, Boston, Mass., September 2015.

Y. S. Eroglu, A. Sahin, I. Guvenc, N. Pala, and M. Yuksel, "Multi-element transmitter design and performance evaluation for visible light communication," in *Proc. IEEE Global Telecommun. Conf. (GLOBE-COM) Workshops*, San Diego, Calif., December 2015.

"Diversity combining and piezoelectric beam steering for multi-element VLC networks," in *Proc. ACM Workshop on Visible Light Commun. Systems*, October 2016.

D. Lee, H. Seo, B. Clerckx, E. Hardouin, D. Mazzarese, S. Nagata, and K. Sayana, "Coordinated multipoint transmission and reception in LTE-Advanced: deployment scenarios and operational challenges," *IEEE Communications Magazine*, vol. 50, no. 2, pp. 148-155, February 2012.

S. Sun, Q. Gao, Y. Peng, Y. Wang, and L. Song, "Interference management through comp in 3GPP LTE-Advanced networks," *IEEE Wireless Communications*, vol. 20, no. 1, pp. 59-66, February 2013.

C. Chen, D. Tsonev, and H. Haas, "Joint transmission in indoor visible light communication downlink cellular networks," in 2013 *IEEE Globecom Workshops*, December 2013, pp. 1127-1132.

H. Ma, L. Lampe, and S. Hranilovic, "Coordinated broadcasting for multiuser indoor visible light communication systems," *IEEE Transactions on Communications*, vol. 63, no. 9, pp. 3313-3324, September 2015.

A. Sewaiwar, S. V. Tiwari, and Y. H. Chung, "Smart LED allocation scheme for efficient multiuser visible light communication networks," *Opt. Express*, vol. 23, no. 10, May 2015.

D. Bykhovsky and S. Arnon, "Multiple access resource allocation in visible light communication systems," *Journal of Lightwave Technology*, vol. 32, no. 8, 2014.

X. Zhang, S. Dimitrov, S. Sinanovic, and H. Haas, "Optimal power al-location in spatial modulation OFDM for visible light communications," in *IEEE Vehicular Technology Conference*, May 2012.

J. Barry, J. Kahn, W. Krause, E. Lee, and D. Messerschmitt, "Simulation of multipath impulse response for indoor wireless optical channels," IEEE J. Select. Areas Commun. (JSAC), vol. 11, no. 3, pp. 367-379, April 1993.

F. Kelly, A. K. Maulloo, and D. Tan, "Rate control for communication networks: Shadow prices, proportional fairness and stability," *The J. of the Operational Research Society*, vol. 49, no. 3, pp. 237-252, 1998.

M. Andrews, L. Qian, and A. Stolyar, "Optimal utility based multi-user throughput allocation subject to throughput constraints," in *Proc. Joint Conf. of the IEEE Computer and Commun. Societies.*, vol. 4, March 2005.

G. M. Roodman, "Postoptimality analysis in integer programming by implicit enumeration: The mixed integer case," *Naval Research Logistics Quarterly*, vol. 21, no. 4, pp. 595-607, 1974.

G. J. Woeginger, *Exact Algorithms for NP-Hard Problems: A Survey*, M. Jünger, G. Reinelt, and G. Rinaldi, Eds. Berlin, Heidelberg: Springer Berlin Heidelberg, 2003.

W. Rhee and J. M. Cioffi, "Increase in capacity of multiuser OFDM system using dynamic subchannel allocation," in *Proc. IEEE Vehic. Technol. Conf (VTC)*, vol. 2, 2000, pp. 1085-1089.

Z. Shen, J. G. Andrews, and B. L. Evans, "Adaptive resource allocation in multiuser OFDM systems with proportional rate constraints," *IEEE Trans. Wireless Commun.*, vol. 4, no. 6, pp. 2726-2737, 2005.

R. Jain, D.-M. Chiu, and W. R. Hawe, *A quantitative measure of fairness and discrimination for resource allocation in shared computer system*. Eastern Research Laboratory, Digital Equipment Corporation Hudson, Mass., 1984, vol. 38.

Marshoud, H., Kapinas, V. M., Karagiannidis, G. K., & Muhaidat, S. (2016). Non-orthogonal multiple access for visible light communications. IEEE Photon. Technol. Lett, 28(1), 51-54.

What is claimed is:

1. A visible light communication (VLC) system, comprising:
    a VLC transmitter including multiple steerable LEDs; and
    a VLC receiver including multiple photodetectors and implementing a diversity combining technique,
    the VLC transmitter periodically transmitting a training sequence to user devices, which comprise the VLC receiver,
    the VLC transmitter and the VLC receiver being deployed in a coordinated way to improve link quality between the user devices and the VLC transmitter by using multiple LED assignment to the user devices, LED steering at the VLC transmitter, and diversity combining at the VLC receiver, and
    the system using received signal strength (RSS), of signals received from the VLC transmitter by the user devices, as an initial assignment algorithm for directing the VLC transmitter LEDs and then following with a secondary heuristic algorithm for directing the VLC transmitter LEDs.

2. The system of claim 1, the user devices of the system periodically sending a channel quality indicator report back to the VLC transmitter.

3. The system of claim 1, the system maximizing total log-throughput to maintain fair resource allocation among VLC receivers.

4. The system of claim 1, the system determining LED assignment using a three-dimensional matching technique.

5. The system of claim 1, the secondary heuristic algorithm being based on a greedy algorithm.

6. The system of claim 5, the greedy algorithm performing a number of iterations that is less than or equal to the total number of transmitter LEDs.

7. The system of claim 1, the secondary heuristic algorithm being based on a proportional rate algorithm.

8. The system of claim 1, the secondary heuristic algorithm being based on a weighted signal strength algorithm.

9. A visible light communication (VLC) system, comprising:
    a VLC transmitter including multiple steerable LEDs; and
    a VLC receiver including multiple photodetectors and implementing a diversity combining technique,
    the system periodically transmitting a training sequence to user devices, which comprise the VLC receiver,
    the VLC transmitter and the VLC receiver being deployed in a coordinated way to improve link quality between the user devices and the VLC transmitter by using multiple LED assignment to the user devices, LED steering at the VLC transmitter, and diversity combining at the VLC receiver,
    the system periodically receiving a channel quality indicator report back to the VLC transmitter, and
    the system using received signal strength (RSS), of signals received from the VLC transmitter by the user devices, as an initial assignment algorithm for directing the VLC transmitter LEDs and then following with a proportional rate algorithm as a secondary heuristic algorithm for directing the VLC transmitter LEDs.

* * * * *